(12) United States Patent
Munns et al.

(10) Patent No.: US 9,460,319 B1
(45) Date of Patent: Oct. 4, 2016

(54) DEVICE FOR SECURING A COMPUTER PORT

(71) Applicant: Foxrun Development Co. LLC., North Hudson, NY (US)

(72) Inventors: Clifford B. Munns, Gastonia, NC (US); Karon Dale Fowler, North Hudson, NY (US)

(73) Assignee: Foxrun Development Co., LLC, North Salem, NY (US)

( * ) Notice: Subject to any disclaimer, the term of this patent is extended or adjusted under 35 U.S.C. 154(b) by 0 days.

(21) Appl. No.: 15/160,802

(22) Filed: May 20, 2016

(51) Int. Cl.
*G06F 21/00* (2013.01)
*G06F 21/85* (2013.01)
*G06F 21/34* (2013.01)
*G06F 21/86* (2013.01)

(52) U.S. Cl.
CPC .............. *G06F 21/85* (2013.01); *G06F 21/34* (2013.01); *G06F 21/86* (2013.01)

(58) Field of Classification Search
CPC ....................................................... G06F 21/86
USPC .......................................................... 726/34
See application file for complete search history.

(56) References Cited

U.S. PATENT DOCUMENTS

| | | | |
|---|---|---|---|
| 5,564,936 A | 10/1996 | David et al. | |
| 5,573,413 A | 11/1996 | David et al. | |
| 5,597,316 A | 1/1997 | David et al. | |
| 5,890,920 A | 4/1999 | David et al. | |
| 5,967,810 A | 10/1999 | Spickler et al. | |
| 6,745,330 B1 | 6/2004 | Maillot | |
| 8,140,733 B2 | 3/2012 | Wong et al. | |
| 8,758,033 B2 | 6/2014 | Hackett et al. | |
| 8,827,331 B2 | 9/2014 | Corcoran et al. | |
| 2005/0174238 A1 | 8/2005 | Foseide | |
| 2007/0004265 A1 | 1/2007 | Yeh | |
| 2007/0132551 A1* | 6/2007 | Mozer | E05B 47/0009 340/5.52 |
| 2008/0041125 A1 | 2/2008 | Poppe | |
| 2010/0031710 A1 | 2/2010 | Chen | |
| 2014/0019652 A1 | 1/2014 | Soffer | |
| 2015/0020189 A1* | 1/2015 | Soffer | G06F 21/85 726/16 |

(Continued)

FOREIGN PATENT DOCUMENTS

WO    2013042108    3/2013

OTHER PUBLICATIONS

Internet Archive WaybackMachine, "Padjack SV RJ45 Lock", Padjack Inc., https://web.archive.org/web/20150423064548/http://www.padjack.com/padjack-versions/padjack-lv-rj45-lock/, Apr. 23, 2015, 4 pages.

(Continued)

*Primary Examiner* — Longbit Chai
(74) *Attorney, Agent, or Firm* — Nancy Guttenberg, Esq.

(57) ABSTRACT

The present invention is directed to a security device for securing computer ports that are in use and also for securing unused computer ports of an electronic device. The invention is also directed to physically blocking access to the computer port. The security device typically comprises a securing mechanism configured for releasably locking the security device within the computer port. The security device further comprises a controlling mechanism that is configured to cause the securing mechanism to move between a locked state and an unlocked state. The security device is further configured to establish an operative connection with an external computing device and authenticate the device via a communication port of the security device.

17 Claims, 17 Drawing Sheets

(56) References Cited

U.S. PATENT DOCUMENTS

| | | |
|---|---|---|
| 2016/0012258 A1 | 1/2016 | Fowler et al. |
| 2016/0012259 A1 | 1/2016 | Fowler et al. |
| 2016/0012260 A1 | 1/2016 | Fowler et al. |

OTHER PUBLICATIONS

Internet Archive WaybackMachine, "Padjack SVE RJ45 Lock", Padjack Inc., https://web.archive.org/web/20151108144608/http://www.padjack.com/padjack-versions/padjack-sve-rj45-lock, Nov. 8, 2015, 4 pages.

Internet Archive WaybackMachine, Padjack LV RJ45 Lock, Padjack Inc., https://web.archive.org/web/20150423064548/http://www.padjack.com/padjack-versions/padjack-lv-rj45-lock/, Apr. 23, 2015, 4 pages.

SPLRJ45-T-Dynamix Unlocking Key for RJ45 Port; retrieved on May 31, 2016 from http://www.dynamix.co.nz/home/netwacc/ncc960/SPLRJ45-T; 4 pages.

Secure RJ45 RJ11 Patch Cord or Jack USB Port Lock Blocker; retrieved on May 31, 2016 from http://www.rjlockdown.com/; 2 pages.

Siemon LockIt secure patch cord system; retrieved on May 31, 2016 from http://www.siemon.com/us/lockit/; 5 pages.

Lock-In Devices—Physical Network Security—Panduit; retrieved on May 31, 2016 from http://www.panduit.com/wcs/Satellite?c=Page&childpagename=Panduit_Global%2FPG_Layout&cid=1345577285600&packedargs=classification_id%3D2630%26locale%3Den_us&pagename=PG_Wrapper; 2 pages.

Panduit RJ45 Lock-In Device for Ethernet Cable—CableOrganizer.com, retrieved on May 31, 2016 from http://www.cableorganizer.com/panduit/rj45-plug-lock-in-device/; 3 pages.

HCI RJ45 Security Parts—Taiwan high performance RJ45 Security Parts Manufacturer retrieved on May 31, 2016 from http://www.hci.com.tw/en/category/RJ45-Security-Parts/B11.html; 4 pages.

Port Blockers & Extraction Tools—Secure RJ Cooper System—Copper Patch Cords; retrieved on May 31, 2016 from http://www.leviton.com/OA_HTML/SectionDisplay.jsp?section=39078&minisite=10251; 2 pages.

Internet Archive Wayback Machine; Our Products; Portal Locks, https://web.archive.org/web/20150228133002/http://portallocks.com/?page_id=33, Feb. 28, 2015; 2 pages.

Kensington USB Port Lock product, http://accessories.us.dell.com/sna/productdetail.aspx? c=us&l=en&s=bsd&cs=111&sku=a7764950, Apr. 29, 2016.

USB Drive Disabler Software Product, http://www.softpedia.com/get/Others/Miscellaneous/USB-Drive-Disabler.shtml, Apr. 29, 2016.

New Scale Technologies, retrieved on May 31, 2016 from http://www.newscaletech.com/technology/squiggle-motors.php, 3 pages.

Park Post, Sandia Science & Technology Park, Apr. 2015, http://sstp.org/wp-content/uploads/April-2015-Park-Post-Electronic.pdf.

Lindy Connection Perfection, Lindy-USA USB Port Blocker and Key product, http://www.lindy-usa.com/usb-port-blocker-pack-of-4-color-code-pink-40450.html, Apr. 29, 2016.

* cited by examiner

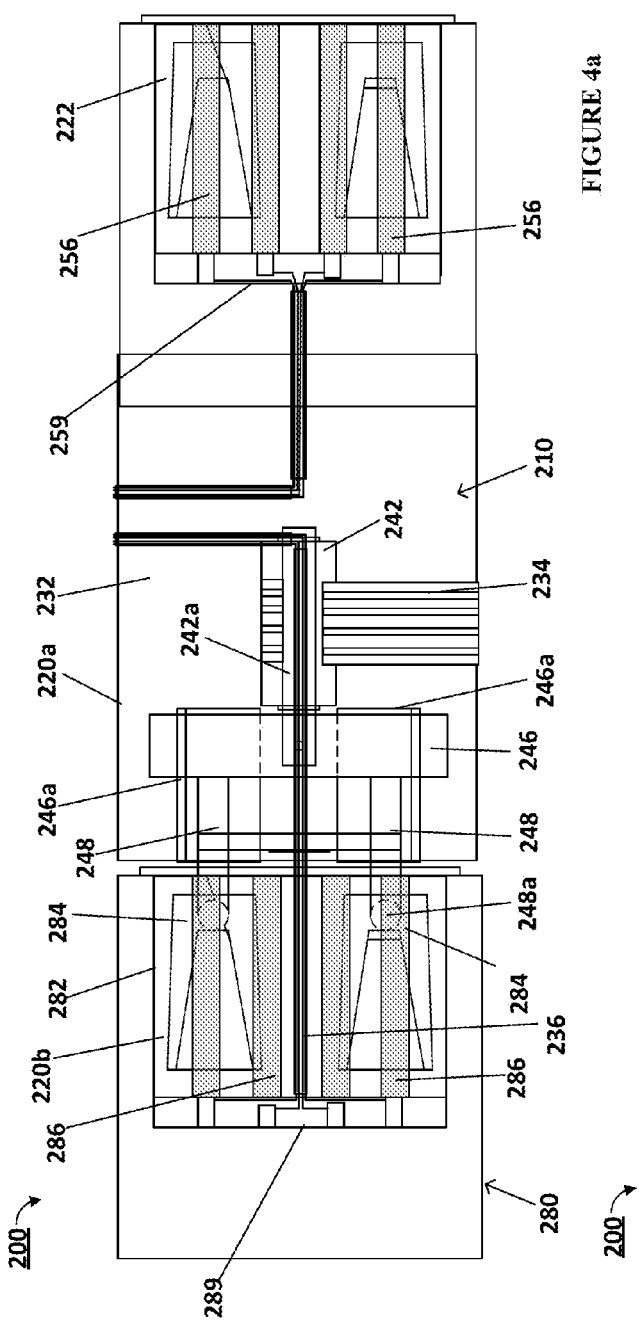
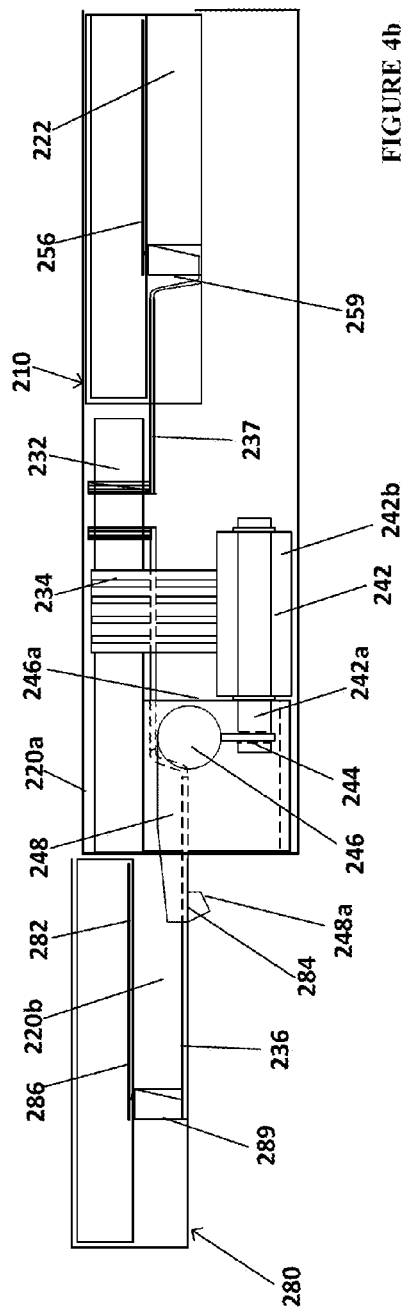
FIGURE 4a
FIGURE 4b

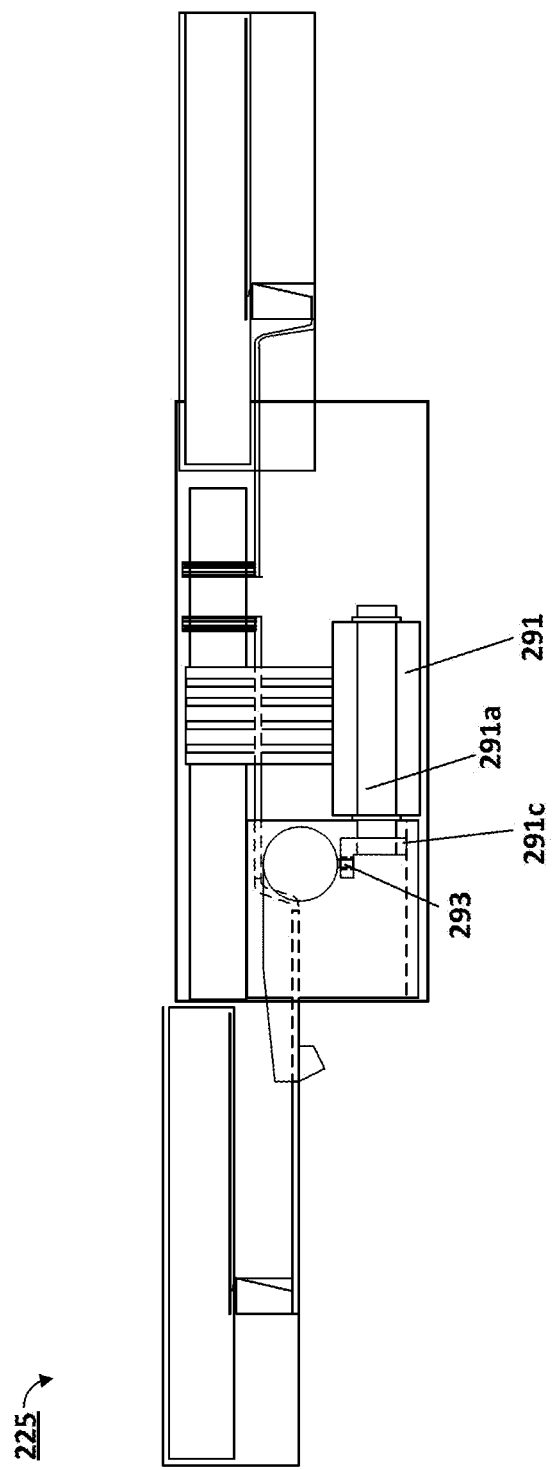

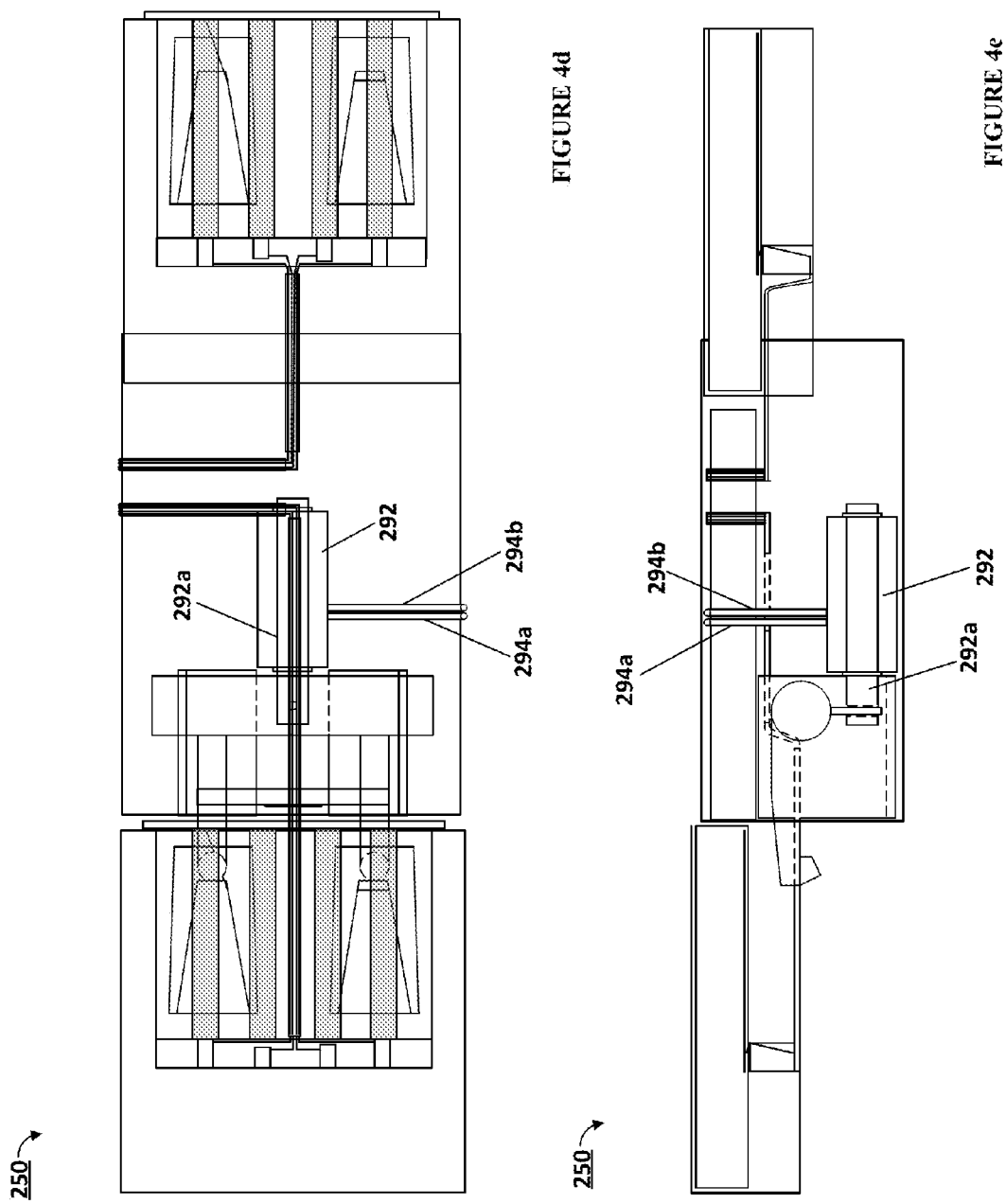

DEVICE FOR SECURING A COMPUTER PORT

FIELD OF THE INVENTION

The present invention relates to devices and methods that enhance computer network security by physically blocking unused and unmonitored computer ports of an electronic device.

BACKGROUND

Most modern computers and servers include at least one, and typically, multiple input/output (I/O) ports. I/O ports are used to connect peripheral devices such mouses, keyboards, scanners, digital cameras, printers, external storage devices and the like, for power supply and/or data transfer purposes. Unauthorized connections to a computer network through I/O ports can result in unauthorized access and theft of network information, or insertion of viruses and malware into the computer and the network. Typically, computers, servers, printers and other devices are supplied with multiple I/O ports. Usually, many of these I/O ports go unused, are often unmonitored, and therefore are susceptible to unauthorized access and unauthorized data transfer.

In view of the security risks associated with external devices connected to computers, there is a need for improved physical security devices for blocking unused I/O ports thus preventing unauthorized access to the port.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to a security device for locking a computer port of an electronic device, comprising: a housing configured for mechanical insertion into the computer port of the electronic device to physically block the computer port; a first communication port configured to establish an operative connection between the security device and an external computing device; a securing mechanism positioned within the housing, the securing mechanism comprising: one or more locking arms that are configured to extended into and engage the computer port in a locked position and disengage the computer port in an unlocked position; and a linear actuator configured to cause the one or more locking arms to move between the locked position and the unlocked position; a controller mechanism positioned within the housing, the controller mechanism being configured to transmit control signals to actuate the linear actuator to thereby cause the one or more locking arms to move between the locked position and the unlocked position; wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

In some embodiments, a link structure coupled to the linear actuator and an axle, wherein the linear actuator is configured to rotate the axle via the link structure; and the axle, the axle being coupled to the one or more locking arms, wherein rotating the axle is configured to cause the one or more locking arms to move between the locked position and the unlocked position.

In some embodiments, or in combination with any of the previous embodiments, the linear actuator comprises: a piezoelectric stator enclosure, wherein vibration of the piezoelectric stator enclosure is configured to cause rotation of a shaft positioned inside the piezoelectric stator enclosure; wherein the controller mechanism is configured to transmit control signals that cause vibrations of the piezoelectric stator.

In some embodiments, or in combination with any of the previous embodiments, the linear actuator comprises a micro-stepper motor, wherein the controller mechanism is configured to transmit control signals that cause the micro-stepper motor to rotate a shaft of the linear actuator.

In some embodiments, or in combination with any of the previous embodiments, the linear actuator comprises a micro-solenoid, wherein the controller mechanism is configured to transmit electric current to the micro-solenoid cause linear displacement of a shaft of the linear actuator.

In some embodiments, or in combination with any of the previous embodiments, the linear actuator comprises a shaft, wherein the linear actuator is configured to cause linear displacement of the shaft by rotating the shaft.

In some embodiments, or in combination with any of the previous embodiments, the one or more locking arms are configured to engage one or more slots of the computer port in the locked position.

In some embodiments, or in combination with any of the previous embodiments, the security device is powered by the external computing device, via the operative connection.

In some embodiments, or in combination with any of the previous embodiments, the securing mechanism is made from non-magnetic materials.

In some embodiments, or in combination with any of the previous embodiments, the validation of the authentication credentials comprises: validating device authentication credentials received from the external computing device; and validating user authentication credentials provided by a user of the external computing device.

In some embodiments, or in combination with any of the previous embodiments, the security device further comprising: a second communication port configured to establish operative connection between a peripheral device and the physically blocked computer port; wherein the controller mechanism is configured to establish an operative communication channel between the peripheral device and the electronic device, via the physically blocked computer port, in response to successful validation of the authentication credentials.

In some embodiments, or in combination with any of the previous embodiments, the validation of the authentication credentials comprises validating device authentication credentials received from the peripheral device.

In some embodiments, or in combination with any of the previous embodiments, the validation of the authentication credentials comprises: determining that the external computing device is disconnected from the security device; de-validating the peripheral device; and terminating the operative communication channel between the peripheral device and the electronic device.

Some embodiments of the invention are directed to a security device for locking a computer port of an electronic device, comprising: a housing configured for mechanical insertion into the computer port of the electronic device to physically block the computer port; a first communication port configured to establish an operative connection between the security device and an external computing device; a securing mechanism positioned within the housing, the securing mechanism comprising: a linear actuator comprising a shaft, wherein the linear actuator is configured to cause a linear displacement of the shaft; one or more locking arms that are configured to extended into and engage the computer port in a locked position and disengage the computer port in an unlocked position; an axle coupled to the one or more locking arms, wherein the axle is configured so that rotating the axle causes the one or more locking arms to move between the locked position and the unlocked position; a link structure coupled to the linear actuator and the axle such that the linear displacement of the shaft of the linear actuator causes the axle to rotate, a controller mechanism positioned within the housing, the controller mechanism being configured to transmit control signals to actuate the linear actuator to thereby cause the one or more locking arms to move between the locked position and the unlocked position; wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

Some embodiments of the invention are directed to a security device for locking a computer port of an electronic device, comprising: a housing configured to physically block the computer port of the electronic device; a first communication port configured to establish an operative connection between the security device and an external computing device; a securing member configured to be coupled to the computer port; a securing mechanism positioned within the housing, the securing mechanism comprising: one or more locking arms that are configured to engage the securing member in a locked position and disengage the securing member in an unlocked position; and a linear actuator configured to cause the one or more locking arms to move between the locked position and the unlocked position; a controller mechanism positioned within the housing, the controller mechanism being configured to transmit control signals to actuate the linear actuator to thereby cause the one or more locking arms to move between the locked position and the unlocked position; wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

In some embodiments, or in combination with any of the previous embodiments, the housing comprises an internal volume, wherein the housing comprises an open side proximate the computer port such that the housing is configured to receive the computer port and the securing mechanism through the open side into the internal volume; and the housing is configured to substantially enclose the computer port and the securing mechanism.

In some embodiments, or in combination with any of the previous embodiments, the security device further comprises one or more rod structures that are configured to secure the securing member and the computer port, wherein the housing comprises an internal volume configured to receive the one or more rod structures.

Unless otherwise defined, all technical and scientific terms used herein have the same meaning as commonly understood by one of ordinary skill in the art to which this invention belongs. Although methods and materials similar, or equivalent to those described herein can be used in the practice or testing of the present invention, suitable methods and materials are described below. In case of conflict, the patent specification, including definitions, will control. In addition, the materials, methods, and examples are illustrative only and are not intended to be limiting.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
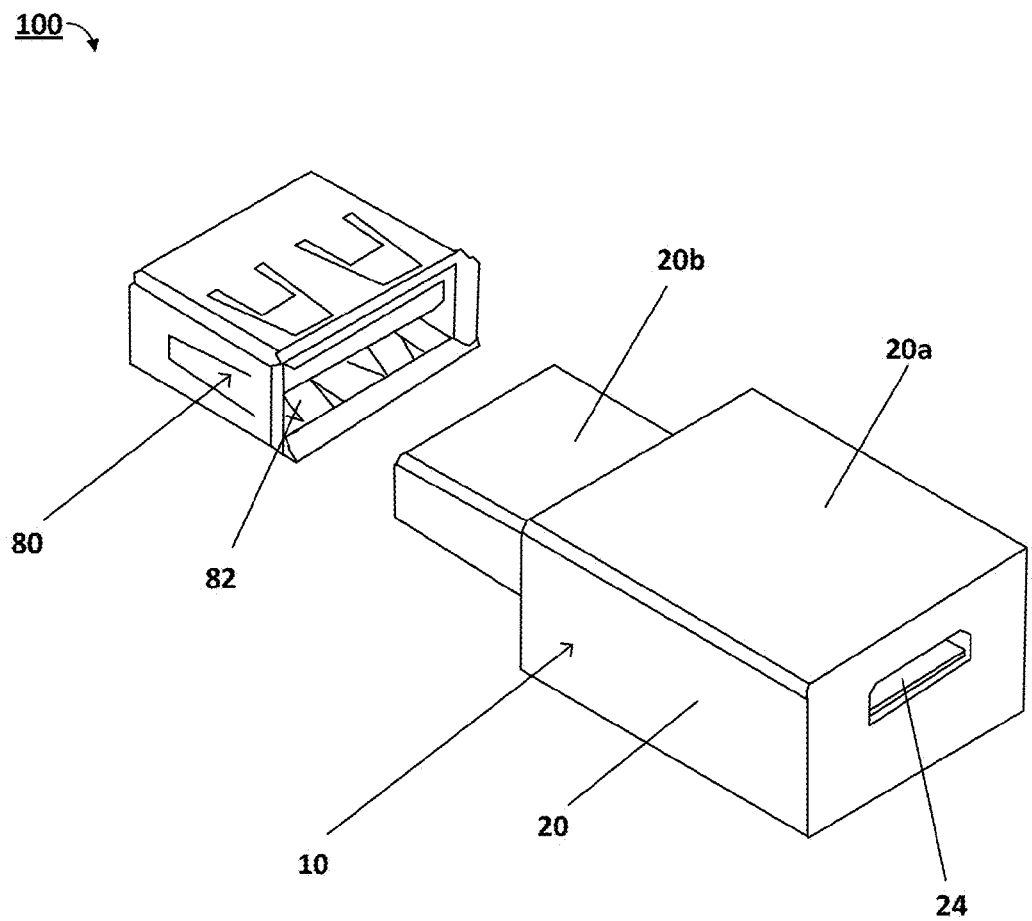
Figure 2A:
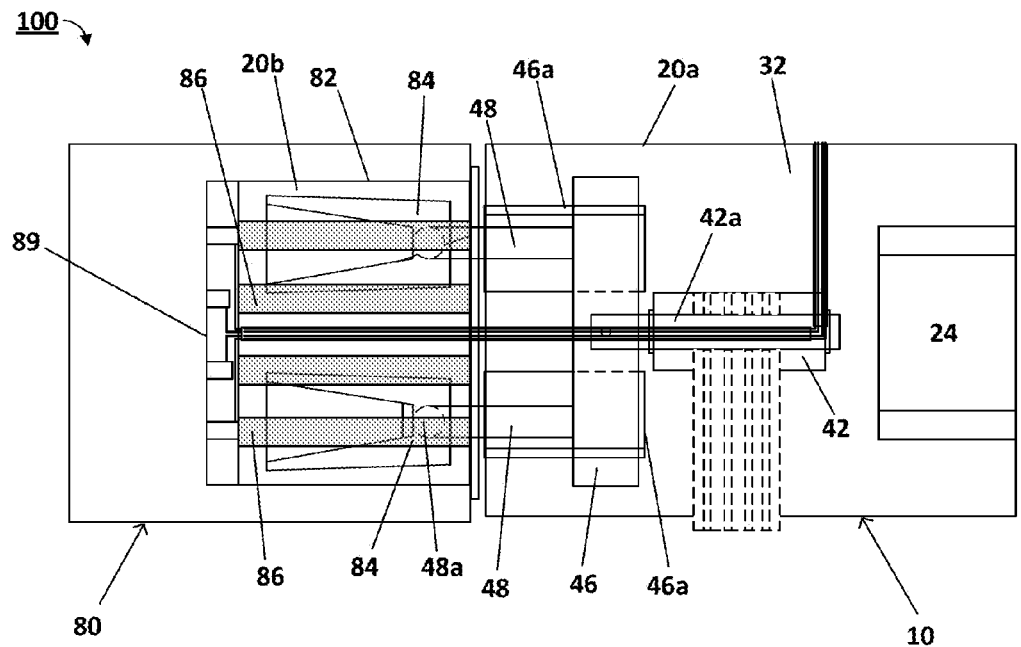
Figure 2B:
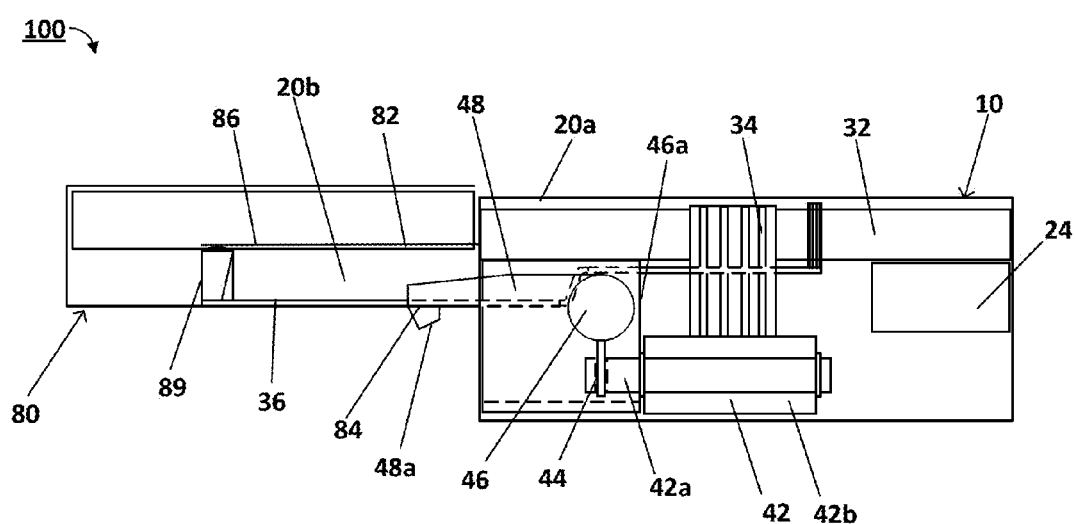
Figure 2C:
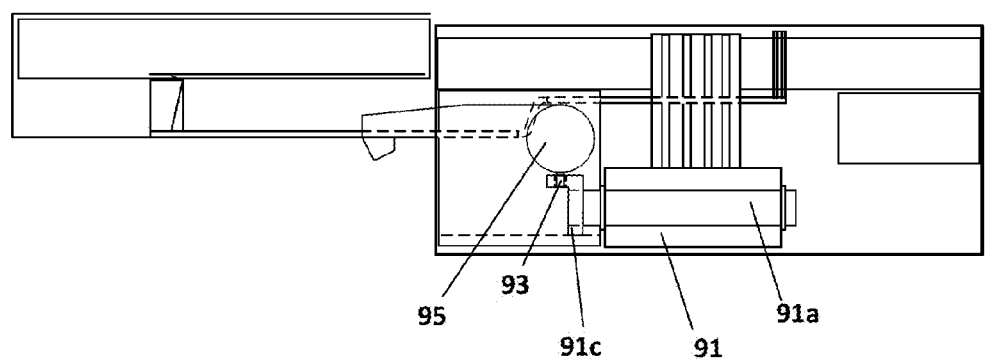
Figure 2D:
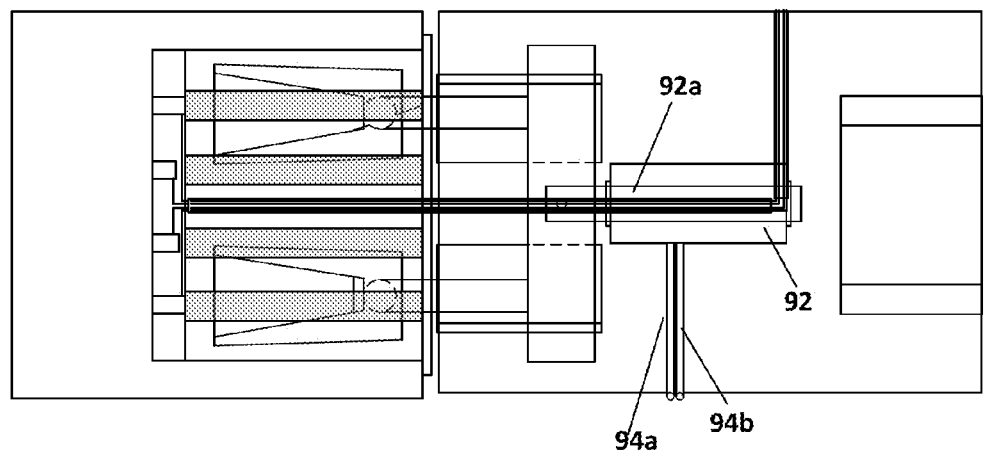
Figure 2E:
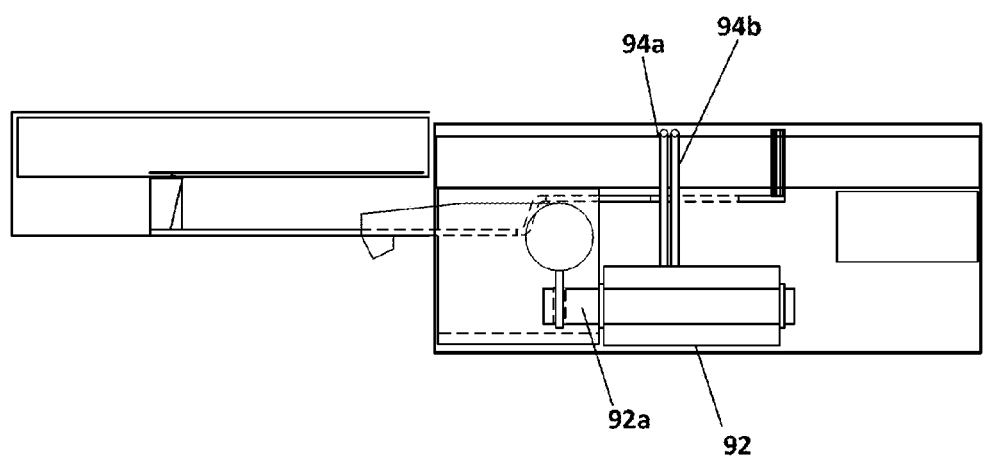
Figure 3:
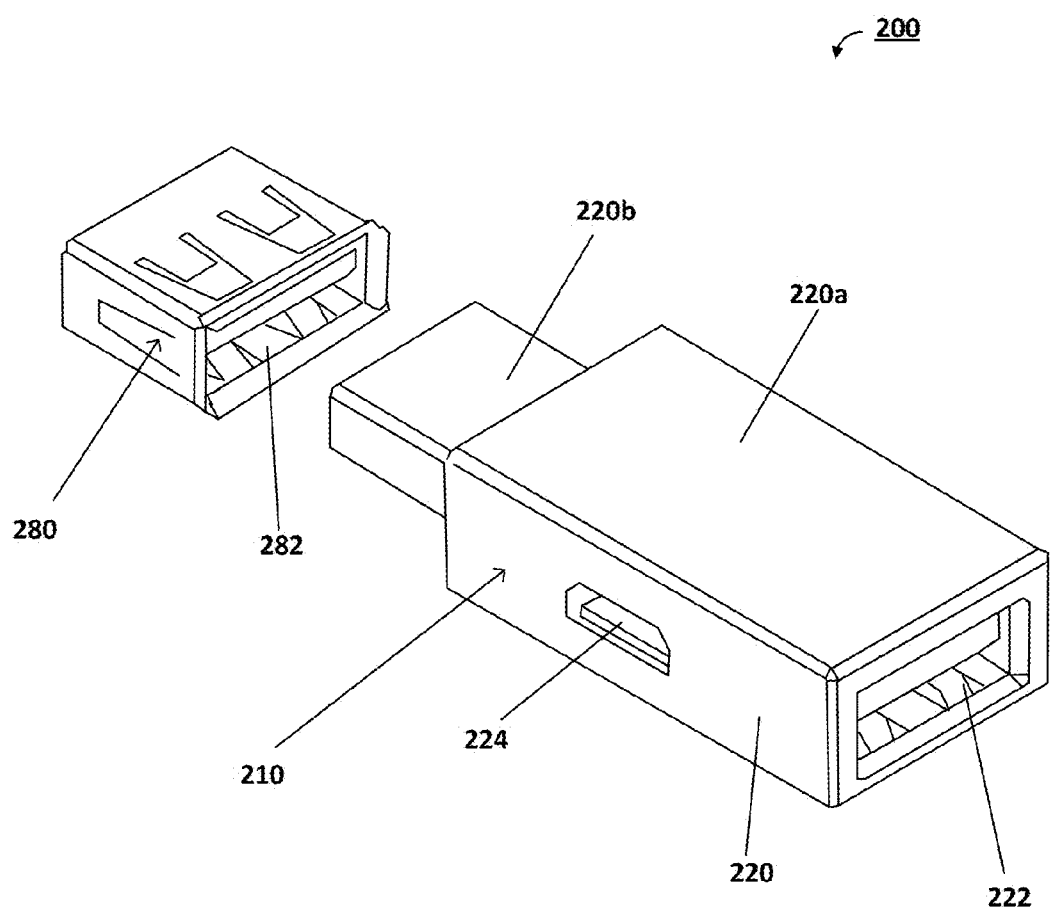
Figure 5:
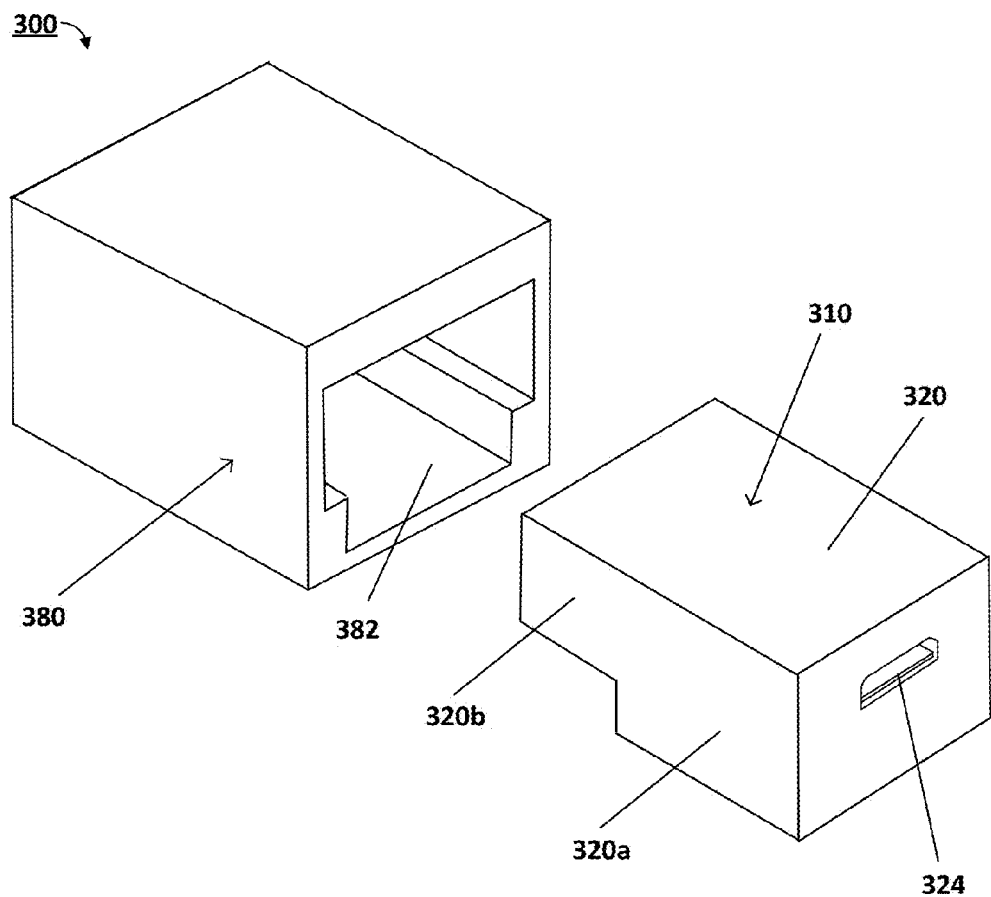
Figure 6A:
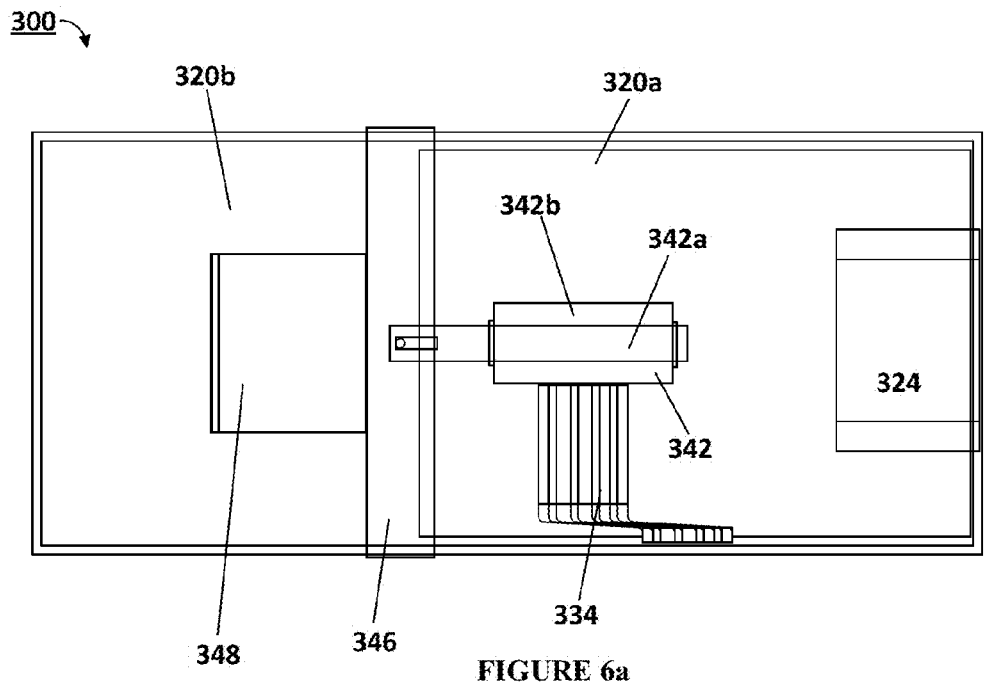
Figure 6B:
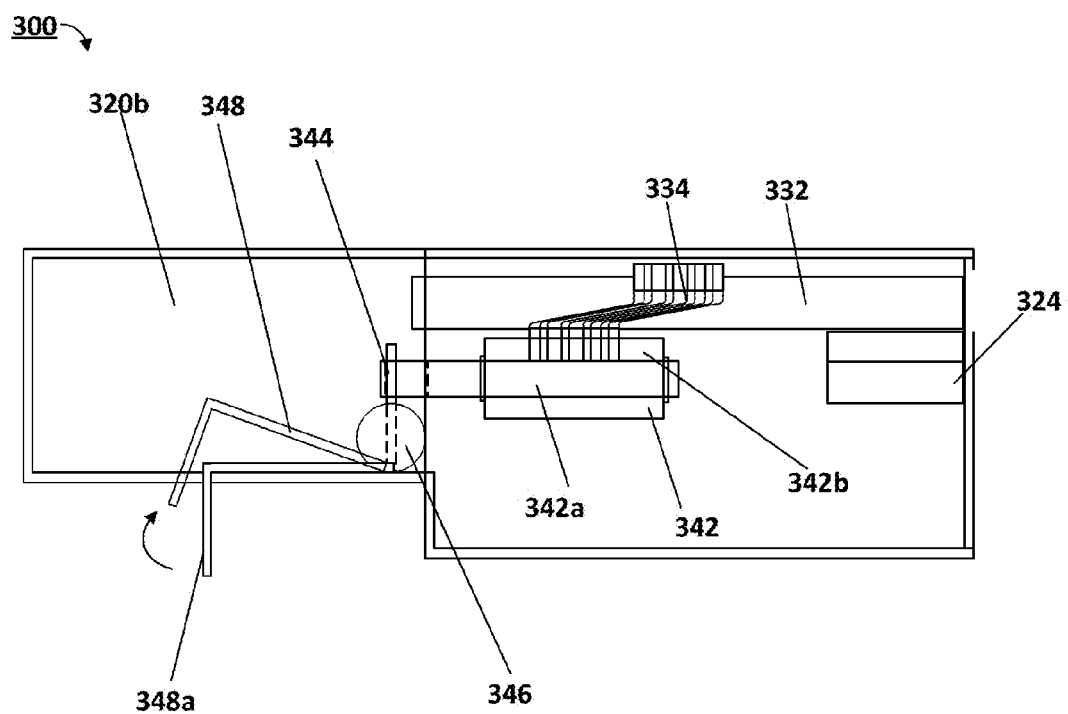
Figure 6C:
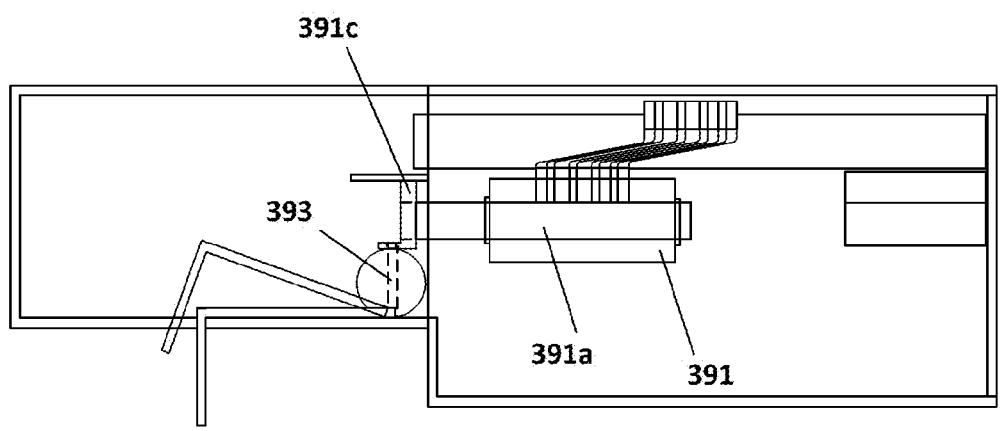
Figure 6D:
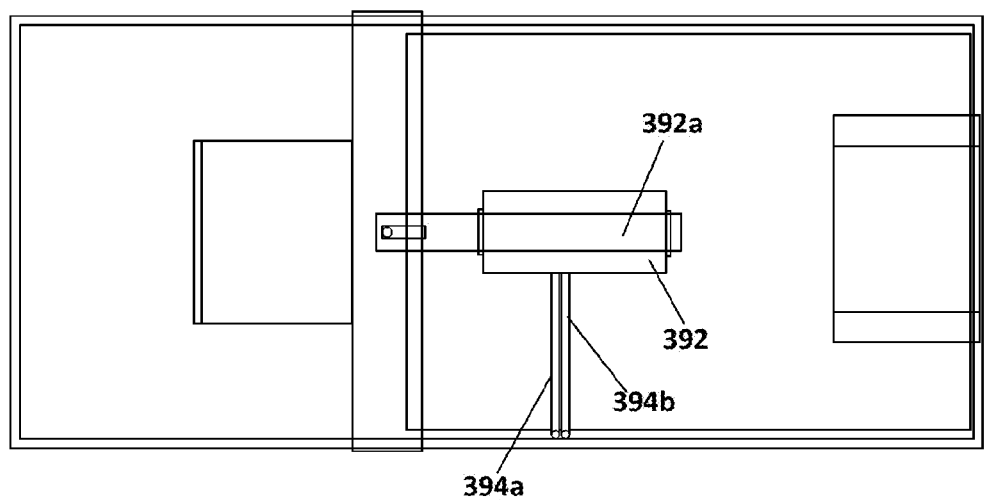
Figure 6E:
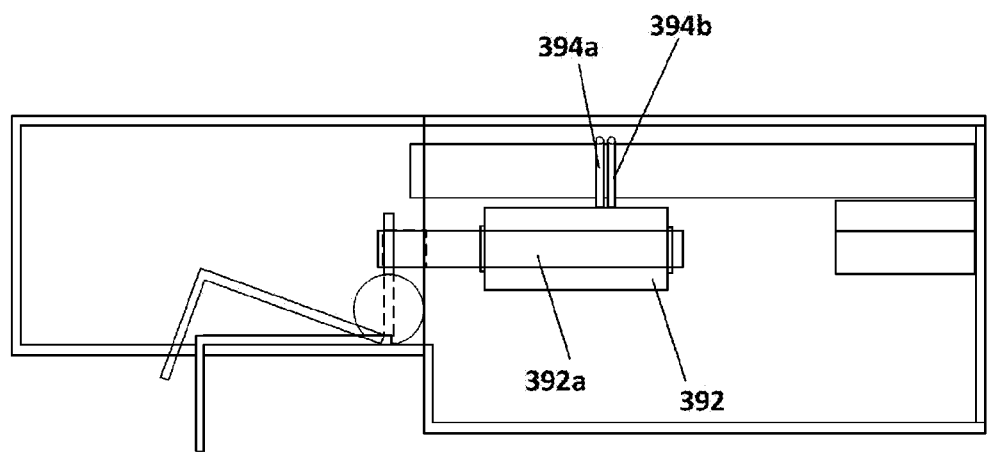
Figure 7:
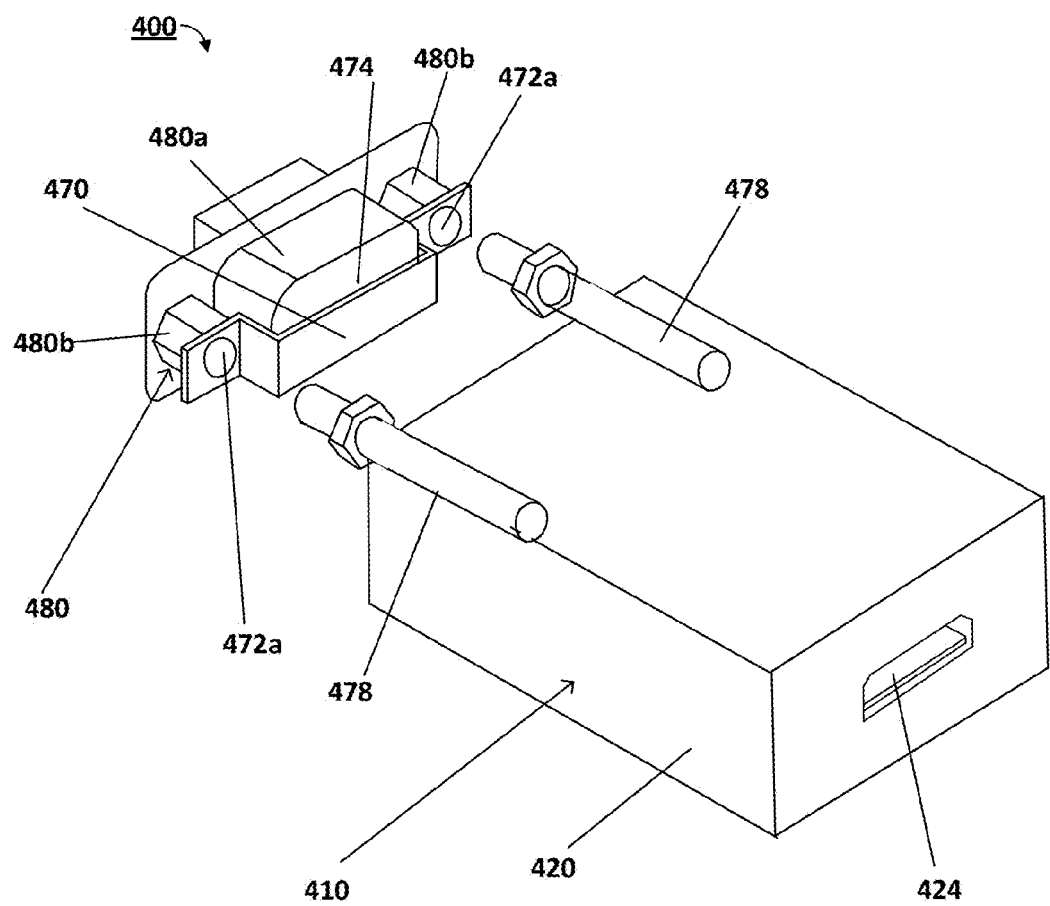
Figure 8A:
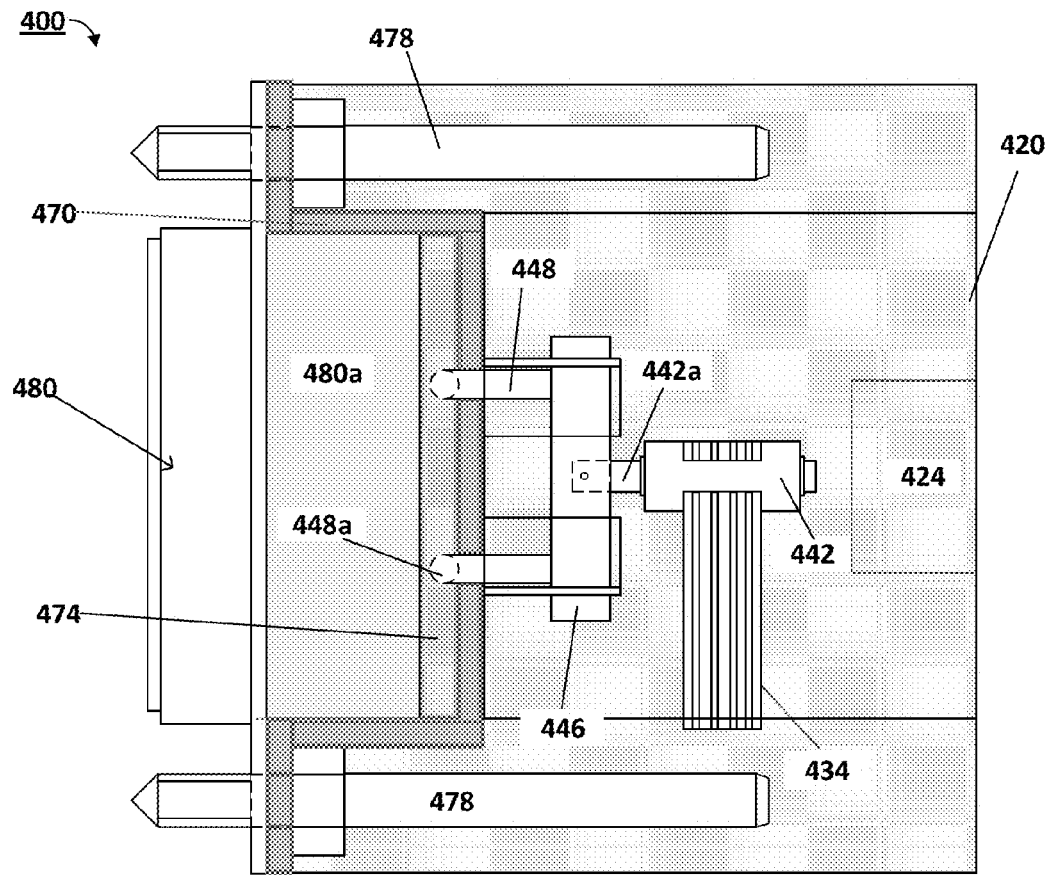
Figure 8B:
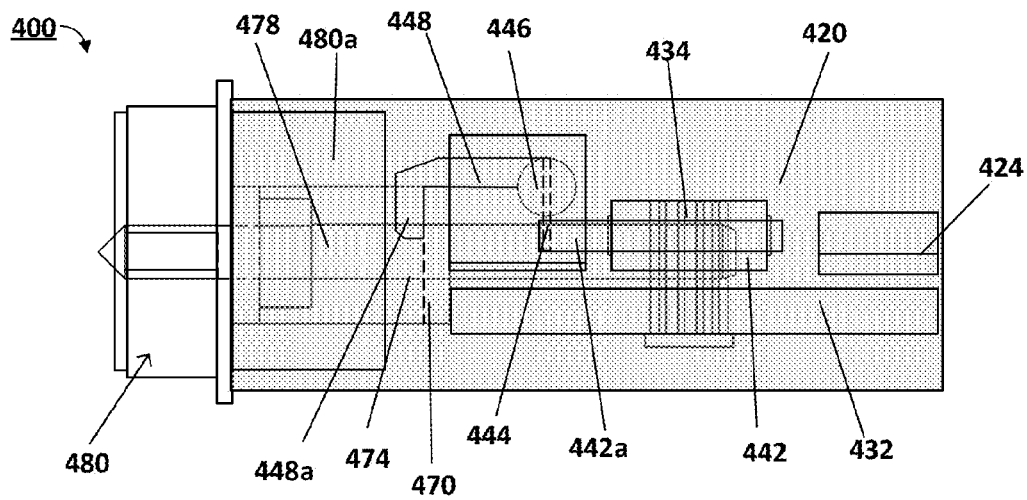
Figure 8C:
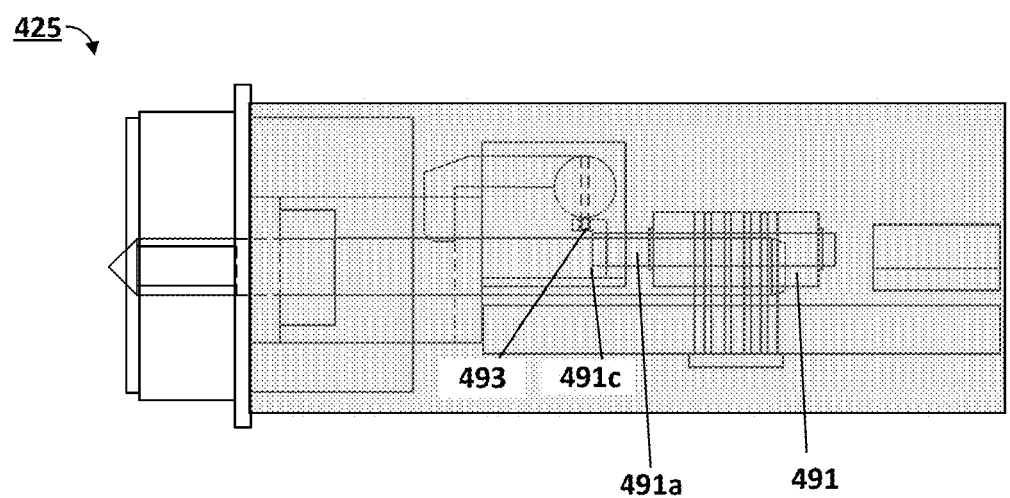
Figure 8D:
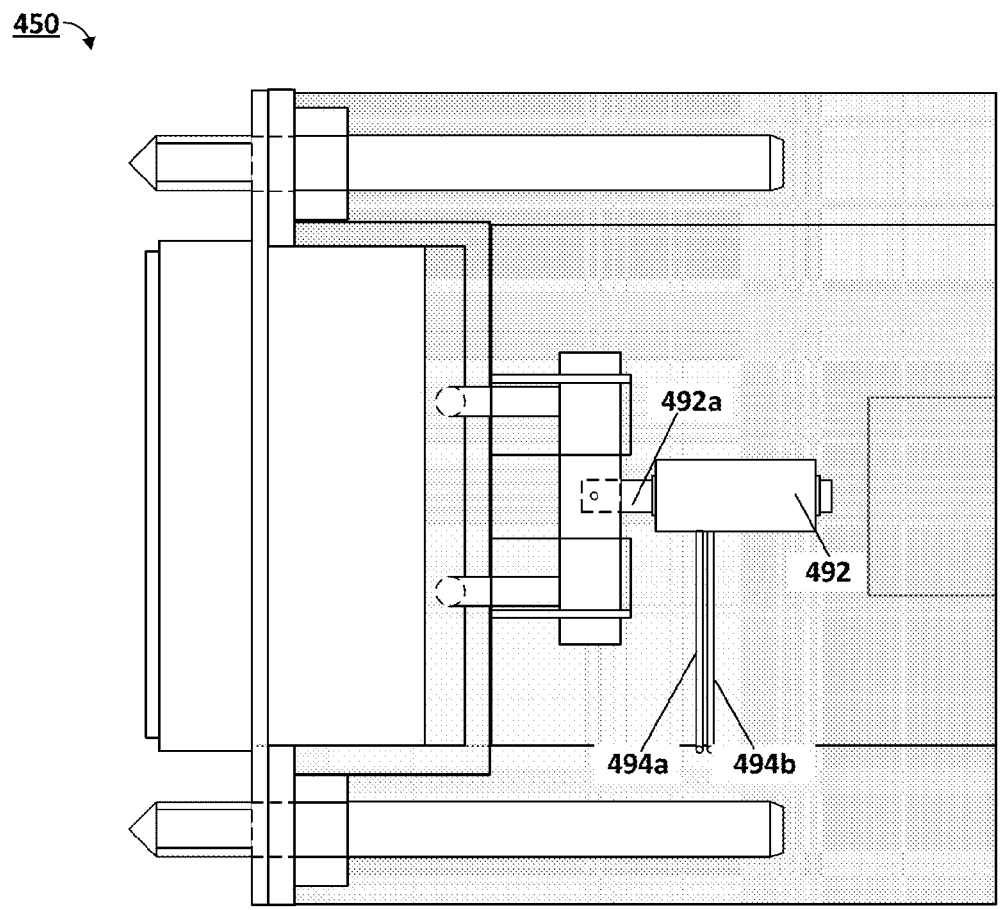
Figure 8E:
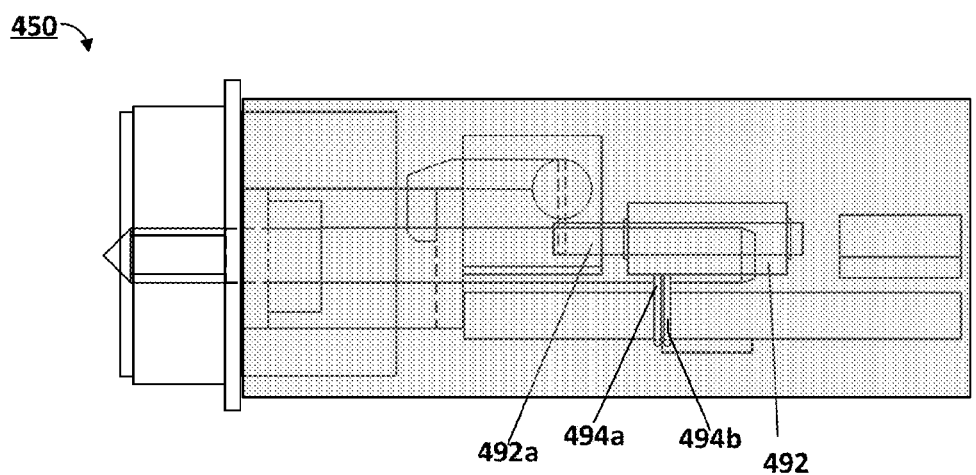
Figure 9:
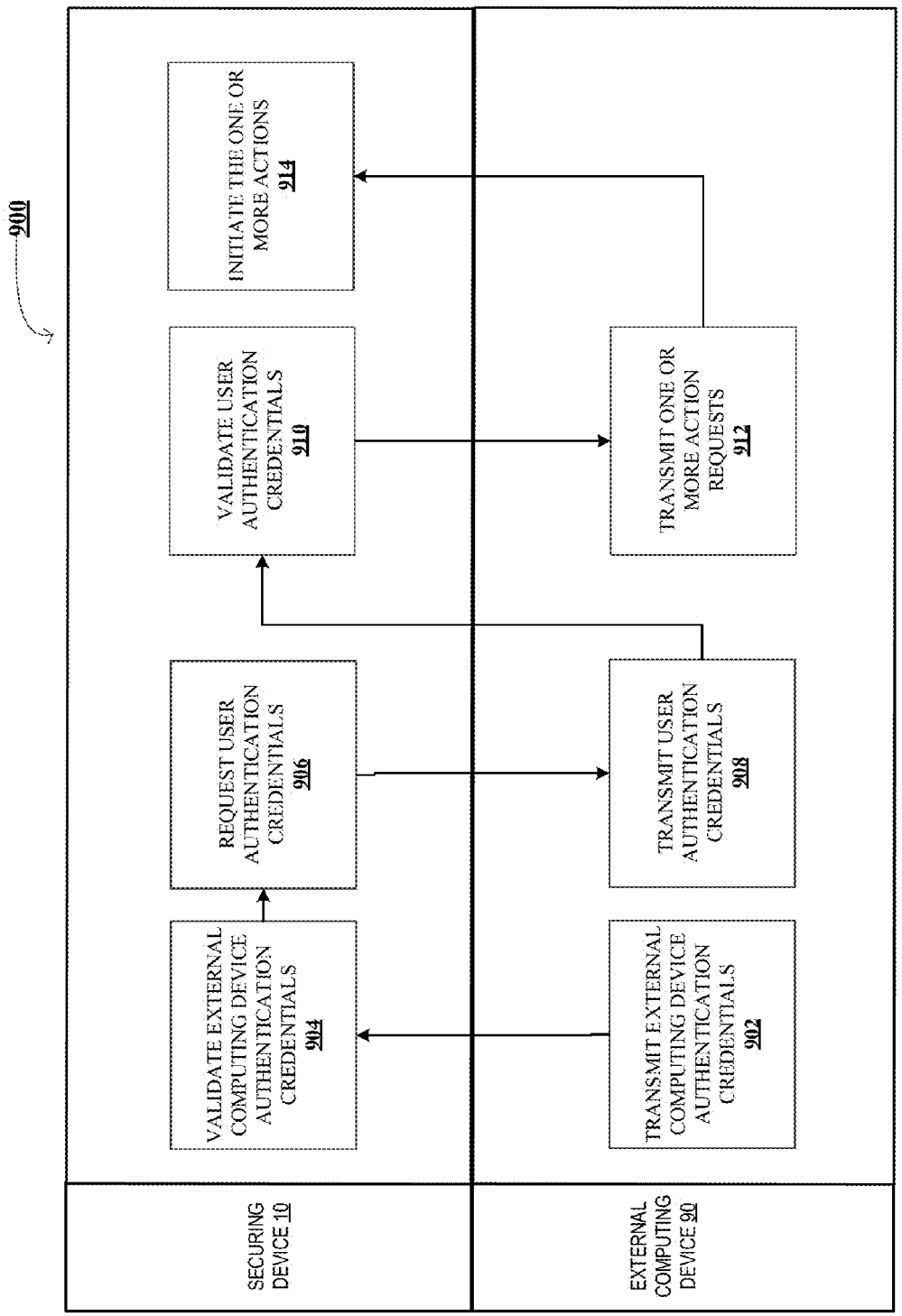

Having thus described embodiments of the invention in general terms, reference will now be made to the accompanying drawings, wherein:

FIG. 1 illustrates a perspective exploded view of a computer port security device assembly 100, in accordance with some embodiments of the invention;

FIG. 2a illustrates a top, cut-away view of the computer port security device assembly 100 of FIG. 1;

FIG. 2b illustrates a side, cut-away view of the computer port security device assembly 100 of FIG. 1;

FIG. 2c illustrates a side, cut-away view of the computer port security device assembly 125, in accordance with some embodiments of the invention;

FIG. 2d illustrates a top, cut-away view of the computer port security device assembly 150, in accordance with some embodiments of the invention;

FIG. 2e illustrates a side, cut-away view of the computer port security device assembly 150 of FIG. 2d;

FIG. 3 illustrates a perspective exploded view of a computer port security device assembly 200, in accordance with some embodiments of the invention;

FIG. 4a illustrates a top, cut-away view of the computer port security device assembly 200 of FIG. 3;

FIG. 4b illustrates a side, cut-away view of the computer port security device assembly 200 of FIG. 3;

FIG. 4c illustrates a side, cut-away view of the computer port security device assembly 225, in accordance with some embodiments of the invention;

FIG. 4d illustrates a top, cut-away view of the computer port security device assembly 250, in accordance with some embodiments of the invention;

FIG. 4e illustrates a side, cut-away view of the computer port security device assembly 250 of FIG. 4d;

FIG. 5 illustrates a perspective exploded view of a computer port security device assembly 300, in accordance with some embodiments of the invention;

FIG. 6a illustrates a top, cut-away view of the computer port security device 300 of FIG. 5;

FIG. 6b illustrates a side, cut-away view of the computer port security device 300 of FIG. 5;

FIG. 6c illustrates a side, cut-away view of the computer port security device assembly 325, in accordance with some embodiments of the invention;

FIG. 6d illustrates a top, cut-away view of the computer port security device 350, in accordance with some embodiments of the invention;

FIG. 6e illustrates a side, cut-away view of the computer port security device of 350 of FIG. 6d;

FIG. 7 illustrates a perspective exploded view of a computer port security device assembly 400, in accordance with some embodiments of the invention;

FIG. 8a illustrates a top, cut-away view of the computer port security device assembly 400 of FIG. 7;

FIG. 8b illustrates a side, cut-away view of the computer port security device assembly 400 of FIG. 7;

FIG. 8c illustrates a side, cut-away view of the computer port security device assembly 425, in accordance with some embodiments of the invention;

FIG. 8d illustrates a top, cut-away view of the computer port security device assembly 450, in accordance with some embodiments of the invention;

FIG. 8e illustrates a side, cut-away view of the computer port security device assembly 450 of FIG. 8d; and FIG. 9 illustrates a high-level process flow depicting a method of securing a computer port using the computer port security device.

Some embodiments of the invention are herein described, by way of example only, with reference to the accompanying drawings. With specific reference to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. The description taken with the drawings makes apparent to those skilled in the art how the various forms of the invention may be embodied in practice.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Embodiments of the invention are directed to a computer port security device, hereinafter referred to as a "security device." Specifically, the security device, in accordance with various embodiments of the invention is configured for providing physical protection both for computer ports that are in use and also for unused computer ports. The security device is configured to physically block a computer port to prevent unauthorized access. In some embodiments, the security device secures the computer port using an electrically actuated, mechanical locking or securing mechanism. In some instances, the security device is configured to unlock the computer port and/or grant access to the computer port based on one or more authentication mechanisms. The aforementioned aspects and many other features of the novel security device are described in detail throughout this disclosure.

"Computer ports," as used herein refer to physical I/O ports or physical interfaces associated with desktop computers, laptop computers, other computing devices, servers, endpoint devices of a network and other electronic devices. Computer ports are typically provided on or are a part of electronic devices and are configured to be coupled with a complementary I/O port connector for transfer of data and/or power. Non-limiting examples of computer ports include serial, parallel, Ethernet, FireWire, Universal Serial Bus, eSATA, Thunderbolt, Lightning, DisplayPort, Fiber Channel, High-Definition Multimedia Interface, Digital Visual Interface, Serial Digital Interface, S/PDIF, fiber optic, coaxial, RJ-45, RS-232, RS-422, IEEE1394, SFP ports and industrial communication ports. Computer ports as referred to in this disclosure include all existing variants of the aforementioned standards and future variants. For example, Universal Serial Bus in one instance refers to USB 1.0, USB 2.0, USB 3.0, and any other variant of the Universal Serial Bus standard. As used in this specification, I/O port connector refers to a connector designed to connect to a computer port or physical I/O port. As such, a computer port or an I/O port connector is often configured to support more than one physical interface, for example, a Thunderbolt port or connector may also support Fiber Channel.

Furthermore, the use of the term "male" and "female" in the claims and this specification refer to their commonly understood usage in the art when referring to I/O port connectors. Each half of a pair of mating I/O port connectors is conventionally assigned the designation male or female. The female connector is generally a receptacle that receives and holds the male connector. If a particular port connector design does not have a male or female physical form, then, for purposes of this disclosure, the terms male and female are used simply to distinguish between the two physical sides of a connection and are interchangeable. One-directional or bi-directional electronic signals are sent across a connected or mated computer port and the I/O port connector. The signals sent across a mated pair of I/O port connectors are configured to encode information and the signal typically takes physical form adapted for this purpose, e.g., electrical waves, light waves, etc. Signals sent across a mated pair of I/O port connectors typically also include electrical current used to power a connected device.

FIG. 1 schematically illustrates a perspective exploded view of a computer port security device assembly 100, in accordance with some embodiments of the invention. As illustrated, the present invention provides a computer port security device 10 or security device 10, which is configured to be inserted into a computer port 80. In some embodiments, the computer port 80 is an I/O port of an electronic device (not illustrated) that is desired to be secured. As illustrated, the computer port 80 comprises an I/O receptacle, or receptacle 82 that is configured to receive a corresponding I/O port connector. Furthermore, FIG. 1 illustrates the computer port 80 as a USB I/O port receptacle, although it is understood that the present invention is configured to be applicable for any I/O port.

The security device 10 comprises a housing 20 defining an internal volume for enclosing one or more components of the security device 10. The housing 20 further defines, in some instances, a first housing portion 20a and an adjacent second housing portion 20b. The second housing portion 20b is configured to be enclosed by the computer port 80 on complete insertion of the security device 10 into the computer port 80. Furthermore, at least a portion of first housing portion 20a typically is exposed when the security device 10 is fully inserted into the computer port 80. In one instance, on complete insertion of the security device 10 into the computer port 80, the second housing portion 20b typically is completely enclosed by the receptacle 82, while at least a portion of the adjacent first housing portion 20a typically is exposed. The second housing portion 20b is typically sized and dimensioned such that the second portion 20b is configured to be connected to or mated with the computer port 80. In some embodiments, the second housing portion 20b comprises an I/O port connector that is configured to be connected to or mated with the computer port 80. In some embodiments, the first housing portion 20a is constructed to be larger than the second housing portion 20b, such that the housing 20 includes a shoulder between the first housing portion 20a and the second housing portion 20b. In some embodiments, the first housing portion 20a at the shoulder abuts or covers a portion of an external surface of the electronic device proximate to computer port 80 when the security device 10 is fully inserted into the computer port 80. This is configured to provide an additional measure of security because the first housing portion 20a covers the computer port 80, and any gaps between the security device 10 and the receptacle 82, thereby preventing/impeding insertion of objects to dislodge the internal locking mechanism of the security device 10.

In some instances, the housing 20 comprises a rigid or a substantially rigid casing to bolster the structural integrity of the security device 10 and to impede tampering of the security device 10 once it is inserted into the computer port 80. In some embodiments, the housing 20 and/or one or more components inside the housing are typically fabricated from one or more metals, alloys, composites, plastics, polymers, ceramics, and other non-metals. In this regard, the one or more materials for the housing are chosen based on their strength, magnetic properties, durability, thermal expansion/contraction, electrical conductivity, and/or other properties that are material to the specific application of the invention. In some instances, the housing 20 is a metal housing. For instance, a non-magnetic material or metal is chosen based on its ability to shield the internal components of the security device 10 from external magnetic fields. As another example, a non-magnetic metal or alloy is chosen to ensure that the housing 20 does not interfere with the functioning of the electronic device. In some embodiments, the housing 20 typically is constructed such that, once inserted into the port 80, there are no openings on the exposed portion of the housing that could provide access to the interior of the housing, and specifically the locking/securing mechanism. In some embodiments, the various communications ports of the housing 20 are constructed and/or positioned such that the interior of the housing 20 is not accessible via the communication ports such as port 24 illustrated in FIG. 1, or ports 223 and 224 illustrated in FIG. 3. In some embodiments, the housing 20 is open on a rear side of the second housing portion 20b facing the computer port 80.

The security device 10 further comprises a first communication port 24 positioned on an exposed surface of the first housing portion 20a. FIG. 1 illustrates the first communication port 24 positioned on a front surface of the housing 20, opposite the rear surface facing the computer port 80. The first communication port 24 of the security device 10 facilitates operative connection of an external computing device (such as a mobile device, a personal digital assistant, a laptop computer, a tablet computer and the like) with the security device 10. The first communication port 24 typically is configured for transfer of data and operative communication between the external computing device (not shown) and the security device 10, when the external computing device is connected to the device 10 by a suitable means, such as a cable with appropriate connectors on the ends. In some instances, the first communication port 24 is a micro port, such as a micro USB port.

The securing/locking mechanism of the security device 10 will now be described with respect to FIGS. 2a and 2b. FIG. 2a illustrates a top, cut-away view of the computer port security device assembly 100 of FIG. 1. While, FIG. 2b illustrates a side, cut-away view of the computer port security device assembly 100 of FIG. 1. FIGS. 2a-2b illustrate the security device 10 being inserted into or mated with the computer port 80.

The security device 10 comprises a controller mechanism and a locking mechanism, positioned in the interior of the housing 20. The controller mechanism typically comprises a controller device 32, transmission cable 34, and a control cable 36. The controller device 32 typically includes a printed circuit board, a microprocessor, a microcontroller, embedded processor, and/or other electronic control devices. The controller device 32 is typically configured to authenticate the external computing device, transmit control instructions to lock or unlock the locking mechanism, and/or establish a communication channel between the electronic device and the external computing device or a peripheral device, via the computer port 80, as will be described in greater detail later on. The transmission cable 34 is a ribbon cable or one or more wires connecting the controller device 32 and a linear actuator 42. The transmission cable 34 is configured to transmit control instructions received from the controller device 32 to the linear actuator 42. The control cable 36 is a ribbon cable or one or more wires configured for transmitting power and control signals between the computer port 80 and the controller device 32. In some instances, the control cable 36 connects the controller device 32 and a contact pin or a ribbon cable adaptor 89 positioned in the receptacle 82 of the computer port 80. In some embodiments, the control cable includes one or more contacts for establishing a connection with the cable adapter 89. The ribbon cable adaptor 89 of the computer port 80 is often coupled to port connector strips 86 of the computer port 80.

The locking mechanism of the security device 10 typically comprises a linear actuator 42, and a mechanical locking mechanism comprising one or more locking arms 48, an axle 46 and a link structure 44. The linear actuator 42 is a device or actuator that is configured to provide linear displacement or linear motion of a shaft 42a. Typically, the linear actuator 42 is configured to actuate the shaft 42a in at least a linear direction, along a predetermined path. For instance, in certain embodiments the linear actuators 42 are configured to cause rotation of the shaft 42a, in addition to linear displacement of the shaft 42a, while in other embodiments the linear actuator 42 causes only the linear displacement of the shaft 42a.

In some embodiments, the shaft 42a comprises external threads or grooves such that, rotary motion of the shaft 42a within an stator enclosure or nut comprising complementary mating threads/grooves, results in a net linear displacement of the shaft 42a along its axis. In this regard, a screw, wheel and axle, or a cam mechanism are utilized. In some instances, for example during fabrication, the turning speed, and the thread design parameters such as the pitch of the threads or grooves are modified to achieve the desired length of linear displacement of the shaft 42a for the intended application. In some embodiments, the linear displacement of the shaft 42a is achieved using a motor of the linear actuator 42, controlled by the controller device 32. In some embodiments, the motor of the linear actuator 42 is a micro-stepper motor or a piezo motor.

In some embodiments, the linear actuator 42 comprises a micro-stepper motor configured for actuating the linear displacement of the shaft 42a. Typically, application of electrical current to the stepper motor by the controller mechanism causes rotation of the shaft 42a. In this regard, the controller device 32 is typically configured to transmit control signals to the linear actuator 42 that cause the stepper motor to actuate rotation of the shaft 42a in either a clockwise or counterclockwise direction. Typically, the micro-stepper motor is configured to cause the rotation of the shaft 42a, in predetermined incremental angles, by selectively energizing one or more electromagnets surrounding the shaft 42a However, in other embodiments, a micro motor such as a piezo motor is utilized as a part of the linear actuator 42. The piezo motor is an ultrasonic motor with a nut 42b (stator) and the mating shaft 42a positioned inside the nut 42b. The nut 42b comprises one or more piezoelectric ceramic actuators. When the controller device 32 causes application of a predetermined electric current to the nut 42b, the piezoelectric nut 42b becomes electrically excited, creating ultrasonic vibrations that cause the nut 42b to vibrate in an orbit, similar to a "hula hoop". These vibrations result in turning of the mating shaft 42a, due to thread friction, thereby effecting the linear displacement of the shaft 42a. The speed and position of the linear displacement of the shaft 42a is configured to be precisely controlled by the controller device 32, with a sub-micrometer or nanometer resolution. The piezo motor linear actuator 42 described above is configured to provide up to about 5 Newton force to the shaft 42a, with a linear displacement speed of about 10 mm/s, and rotary speed of about 12,000 rpm. Furthermore, the piezo motor linear actuator 42 is configured to be manufactured in compact sizes, with dimensions ranging from about 1.8 mm to about 6 mm. Furthermore, the piezo motor linear actuator 42 is typically configured to provide smooth and quiet operation in comparison with conventional motors.

The shaft 42a of the linear actuator 42 is coupled to an axle 46 via a link structure 44, such that linear motion of the shaft 42a causes the axle to rotate or pivot about its axis. In this way, precisely controlled motion of the axle is achieved. In some instances, the axle 46 is an elongated structure, positioned within the housing 20 such that the axis of the axle 46 is substantially perpendicular or non-parallel with the axis of the shaft 42a. The axle 46 is supported by axle supports 46a. The link structure 44 is a pin, a member with a ring-like structure on one end positioned around the shaft 42a, or another structure configured for conveying relative motion between non-parallel components 42a and 46.

The axle 46 typically is coupled to one end of one or more locking arms 48, such that the locking arms are configured to pivot about an axis of the axle 46. The other end of each of the one or more locking arms 48 comprise a locking hook 48a. The locking mechanism is positioned within the housing 20 such that the locking hook 48a of each of the locking arms 48 is positioned facing and proximate one or more apertures or slots 84 in the receptacle 82 of the computer port 80. The one or more locking arms 48 are typically configured to extend into and engage one or more apertures, slots or grooves 84 of the computer port 80. In this regard, FIG. 2b illustrates the locking arm 48 extending into the receptacle 82 of the computer port 80. In some instances, as illustrated by FIG. 2b, the locking arm 48 extends out of the first housing portion 20a and into the computer port 80.

FIG. 2c illustrates a side view of a computer port security device assembly 125, in accordance with some embodiments of the invention. FIG. 2c illustrates the computer port security device assembly 125 as being substantially identical to the assembly 100 of FIGS. 2a and 2b, except that the shaft 91a of the linear actuator 91 further comprises a link block 91c that is configured to be coupled to the link structure 93. Typically, the link block 91c is a sliding link block that comprises a threaded recess/bore for receiving the shaft 91a and is configured such that the shaft 91a is allowed to rotate within the recess, while the sliding link block 91c is configured to be linearly displaced along with the shaft 91a. The link block 91c further comprises a connecting tab comprising a recess/aperture for coupling with the link structure 93. Furthermore, the link block 91c comprises a holding tab that is configured to contact the housing and thereby prevent the link block 91c from rotating with the shaft 91a. As such, the linear displacement of the shaft 91a is configured to cause the rotation of the axle 95, via the link block 91c and the link structure 93. In this regard, in some instances the link block 91c is configured to be linearly displaced along with the shaft 91a, without rotating along with the shaft 91a. In some embodiments, the link block 91c is made of plastic, for example using injection molding or any other suitable process.

FIGS. 2d and 2e illustrate a top view and a side view of a computer port security device assembly 150, in accordance with alternate embodiments of the invention, respectively. FIGS. 2d and 2e illustrate the computer port security device assembly 150 as being substantially identical to the assembly 100 of FIGS. 2a and 2b, except that the linear actuator 92 employs a micro-solenoid to cause linear displacement of the shaft 92a. Furthermore, the transmission cable comprises two wires 94a and 94b that are configured to convey control signals from the controller device to the linear actuator 92. Typically, application of electrical current to the micro-solenoid by the controller mechanism causes linear displacement of the centrally positioned shaft 92a along an axis of the shaft.

Typically, the security device 10 is a passive device. In this regard, the security device 10 draws power from the external computing device, when connected via the first communication port 24. In some embodiments, the security device 10 draws power from the electronic device via the computer port 80. However, a security device 10 comprising its own power source such as a battery is also contemplated herein.

The mechanism for physical locking of the computer port 80 by the controller mechanism and a locking mechanism will be detailed now with respect to FIGS. 2a and 2b. Typically, the security device 10 and specifically, the housing 20, the controller mechanism, the locking mechanism and other components of the security device 10 are manufactured out of non-magnetic materials, thereby preventing tampering of the security device 10 by one or more external magnetic devices. Once the security device 10 is fully inserted into the receptacle 82 of the computer port 80, the controller device 32 (for example, in response to instructions from the connected external computing device) transmits signals via the transmission cable 34 to the linear actuator 42, causing the piezo nut 42b to vibrate about an axis. As discussed previously, these vibrations cause the shaft 42a to rotate and thereby be displaced linearly in a direction away from the port 80. One end of the link structure 44 typically is displaced along with the shaft 42a. This displacement typically results in the other end of the link structure 44 applying a moment or force (in a direction away from the port 80) to the axle 46, causing the axle 46 to rotate or pivot about its axis (for example, in a counter-clockwise direction with respect to FIG. 2b). This causes the one or more locking arms 48 and the locking hooks 48a to be pivoted towards the slots 84, from an unlocked to a locked position. The locking hooks 48a are received and secured through the slots 84, thereby locking the security device 10 so that it cannot be easily physically withdrawn from the receptacle 82, without damaging the port. In some instances, the locking mechanism is configured such that, any attempt to withdraw a locked security device 10 from the receptacle 82 with external physical effort or brute force would result in the rupture and fracture of the receptacle 82 before the security device 10 could be withdrawn, rendering the port 80 unusable. Therefore, unauthorized access to the computer port 80 may not be obtained by mere brute force. Furthermore, this configuration of the security device 10 would also make any unauthorized access easy to detect.

For unlocking the device, the controller device 32 (for example, in response to instructions from the connected external computing device/authentication validation) is configured to transmit signals via the transmission cable 34 to the linear actuator 42, causing the piezo nut 42b to vibrate about an axis in a direction opposite to the vibration previously described. These vibrations cause the shaft 42a to rotate and thereby be displaced linearly in a direction towards the port 80. One end of the link structure 44 is displaced along with the shaft 42a. This displacement results in the other end of the link structure 44 applying a moment or force (in a direction towards the port 80) to the axle 46, causing the axle 46 to rotate or pivot about its axis (for example, in a clockwise direction with respect to FIG. 2b). This causes the coupled one or more locking arms 48 and the locking hooks 48a to be lifted away from the slots 84 (from a locked to an unlocked position), thereby unlocking the security device 10 so that it typically is withdrawn from the receptacle 82, without requiring any manual input such as pressing a release button, or inserting a physical key.

This embodiment finds applications in securing unused computer ports 80. The unlocking mechanism described above is executed when use of the ports 80 are desired. A method 900 of securing a computer port using the computer port security device, illustrated by FIG. 9, will be described presently.

Now, referring to FIG. 9, the security device 10 is present, initially, in a locked position within the computer port 80. An external computing device 90, such as a smart phone, hand held device, and the like, typically is suitably connected to the security device 10, via the first communication port 24. As such, an operative communication channel typically is established between the external computing device 90 and the security device 10. The first communication port 24 is also be referred to as the authentication port 24. In some embodiments, connecting the external computing device causes activation of the controller device 32 and/or power to be drawn by the security device 10 from the external computing device. Initially, the security device 10 seeks to validate/authenticate the external computing device. As indicated by block 902, the security device 10 receives device authentication credentials from the external computing device. In this regard, in some instances, the security device 10 transmits instructions causing the retrieval and transmission of the device authentication credentials, while in other instances, the credentials are transmitted automatically, in response to establishing the connection. Device authentication credentials refer to one or more device identification credentials or unique identifiers, which are typically used for validating the identity of the external computing device. As such, information transmitted between the security device 10 and the external computing device typically is encoded, encrypted or otherwise transformed. In some instances, the information is salted and hashed (for example, using a cryptographic hash function) prior to transmission. In this regard, the information is encrypted using a private key, and transmitted along with salt and a public key. In some embodiments, the controller device 32 causes presentation of a user interface on a display of the external computing device. The controller device 32 then provides notifications and displays a status of validation of credentials on the user interface.

Next, the security device 10 validates the received device authentication credentials at block 904. In this regard, the controller device 32 compares the received authentication credentials with that of known devices stored at a secure memory location either on the security device 10 or on the electronic device. Based on the successful validation of the device authentication credentials, the security system 10 proceeds to authenticate itself to the external computing device. In this regard, the security device 10 transmits security device identifiers to the external computing device, which typically is validated by the external computing device.

Subsequently, the security device 10 requests user authentication credentials at block 906. In some instances, the security device presents the request to the user via the user interface. The user seeking to utilize the port provides user authentication credentials on the external computing device, for example via the user interface, which are then transmitted to the security device 10, as illustrated by block 908. Next at block 910, the security device 10 validates the user authentication credentials, and based on the successful validation of the credentials after comparison with known user credentials, the system requests one or more action requests or commands from the user, at block 912. In some instances, the user provides the one or more actions using the user interface, and/or selects one or more actions from a list presented by the security device 10. The system proceeds to initiate the requested actions at block 914.

The one or more actions comprise unlocking the security device 10. Based on the received user input, the controller 32 is configured to the security device. The user then withdraws the device 10 from the receptacle 82, to use the receptacle. However, in other embodiments described herein, the user is not required to withdraw the device 10 from the port 80 to utilize the port 80, and is allowed to connect peripheral devices to the port 80 and hence the electronic device, with the security device 10 being inserted into the port 80. Similarly, the one or more actions comprise securing the device 10. Here, the user initially inserts an unlocked security device 10 in the computer port 80, at block 902, to lock the security device 10 in the receptacle 82 of the computer port 80.

FIG. 3 schematically illustrates a perspective exploded view of a computer port security device assembly 200, in accordance with some embodiments of the invention. This embodiment of the invention finds applications in securing computer ports that are in use, because the security device 210 in this embodiment performs authentication and permits authorized access to the port 280 without requiring removal of the security device 210 from the computer port 280.

The computer port security device assembly 200 typically is substantially similar to the assembly described with respect to FIGS. 1, 2a and 2b. However, in this embodiment, the first housing portion 220a of the security device 210 additionally comprises a second communication port 222, in addition to the first communication port 224 that is used for authentication via an external computing device discussed previously. As illustrated in FIG. 3, in some instances, the first communication port 224 typically is provided on a lateral side of the first housing portion 220a. Although, FIG. 3 illustrates the second communication port 222 being positioned on the front side of the first housing portion 220a away from the computer port 280, it is understood that the second communication port 222 is configured to be positioned at any suitable location on the housing. The second communication port 222 typically is an I/O port or I/O port receptacle configured to receive a complementary I/O port connector. In some embodiments, the second communication port 222 is similar to the computer port 280, while in other embodiments, the second communication port 222 is a different type of I/O port (For example, the computer port 280 is a standard USB port, while the second communication port 222 is a micro USB port). For example, based on validation of the user's authentication credentials, the second communication port 222 typically is utilized to connect a secondary device, a peripheral device or another suitable device to the electronic device, via the security device 210 for normal operation, without requiring removal or unlocking of the security device 210.

FIGS. 4a and 4b illustrate a top, cut-away view and a side, cut-away view of the computer port security device assembly 200 of FIG. 3, respectively. FIGS. 4a and 4b illustrate the first housing portion 220a of the security device 210 comprising the second communication port 222. The second communication port 222 further comprise a control cable 237, that is configured to connect a peripheral device inserted into the port 222 with the controller device 232 and a contact pin or a ribbon cable adaptor 259 positioned in the second communication port 222. The ribbon/control cable 237 of the second communication port 222 is configured to also be coupled to port connector strips 256 of the second communication port 222. Here, the securing mechanism is typically similar to that of the embodiments described with respect to FIGS. 2a and 2b. In some embodiments, the linear actuator 242 comprises a micro-stepper motor or a piezo motor for causing the linear displacement of the shaft 242a.

The method of securing a computer port 280 using the security device 210 illustrated in FIGS. 3, 4a and 4b will be described now. Initially, the external computing device is inserted into the first communication port 224. The external computing device and the user typically is authenticated based on the method 900 described with respect to FIG. 9. Once the user is authenticated, the user typically inserts a peripheral device into the second communication port 222. In some embodiments, insertion of the peripheral device into the second communication port 222 causes the security device 210 to switch power sources, automatically, from the external computing device to the electronic device of the computer port 280. The security device 210 then receives device identifiers from the peripheral device to identify and validate the peripheral device. The security device 210 then validates the peripheral device based on identifying the credentials of the device. In some instances, the security device 210 blocks access to unknown peripheral devices or peripheral devices whose validation has lapsed or those that have been de-validated.

Furthermore, the system is typically configured to initiate presentation of a user interface of the external computing device connected to the security device 210, either automatically, or in response to a user request. The system presents notifications regarding status of validation of the external communication device, the peripheral device and/or the user, via the user interface. In some embodiments, the security device 210 seeks user authentication for a second time after connection of the peripheral device. Here, the user provides user authentication credentials via the user interface provided on the external computing device. The security device 210 then initiates connection of the peripheral device with the electronic device, via the security device 210 and the computer port 280. In this regard, signals between the peripheral device and the electronic device typically are transmitted via the transmission cables 236 and 237, and/or the controller device 232. The user then disconnects the external computing device from the security device 210.

In some embodiments, for instance when the user is connecting the peripheral device for a first time, the security device 210 receives first peripheral device identifiers from the user via the user interface. The security device 210 then receives second peripheral device identifiers from the peripheral device. The security device 210 then validates the peripheral device based on determining that the first peripheral device identifier is the same as the second peripheral device identifier.

In some embodiments, the security device 210 allows communication between the peripheral device and the electronic device as long as the peripheral device is connected to the electronic device. In some embodiments, the security device 210 allows communication between the peripheral device and the electronic device, for a predetermined period of time after connection of the peripheral device and the electronic device, and/or disconnection of the external computing device from the security device 210. In some embodiments, the security device 210 requires re-authentication in the event that the electronic device loses its power or if the electronic device is turned off. In some embodiments, the security device 210 de-validates the peripheral device when the external computing device is disconnected. The user is allowed to modify the time period or provide additional criterial using the user interface. Typically, the security device 210 allows connection of the peripheral device based on identifying the peripheral. As such, in some instances, the security device 210 only allows connection of known peripherals that have been previously connected to the security device 210.

FIG. 4c illustrates a side view of a computer port security device assembly 225, in accordance with some embodiments of the invention. FIG. 2c illustrates the computer port security device assembly 225 as being substantially identical to the assembly 200 of FIGS. 4a and 4b, except that the shaft 291a of the linear actuator 291 further comprises a link block 291c that is configured to be coupled to the link structure 293. Typically, the link block 291c is similar to the link block described with respect to FIG. 2c. As such, the linear displacement of the shaft 291a is configured to cause the rotation of the axle, via the link block 291c and the link structure 293.

FIGS. 4d and 4e illustrate a top view and a side view of a computer port security device assembly 250 in accordance with alternate embodiments of the invention, respectively. FIGS. 4d and 4e illustrate the computer port security device assembly 250 as being substantially identical to the assembly 200 of FIGS. 4a and 4b, except that the linear actuator 292 employs a micro-solenoid to cause linear displacement of the shaft 292a. Furthermore, the transmission cable comprises two wires 294a and 294b that are configured to convey control signals from the controller device to the linear actuator 292. Typically, application of electrical current to the micro-solenoid by the controller mechanism causes linear displacement of the centrally positioned shaft 292a along an axis of the shaft.

FIG. 5 schematically illustrates a perspective exploded view of a computer port security device assembly 300, in accordance with some embodiments of the invention. The computer port security device assembly 300 typically is substantially similar to the assembly described with respect to FIGS. 1, 2a and 2b. However, in this embodiment, a RJ-45 type computer port 380 is illustrated. RJ-45 is the common nomenclature referring to 8P8C modular connectors, which are often used for Ethernet connections.

FIGS. 6a and 6b illustrate a top, cut-away view and a side, cut-away view of the security device 310 of FIG. 5, respectively. Here, the security device 310 typically is substantially identical to that described with respect to FIGS. 1, 2a and 2b. The mechanism for physical locking and unlocking the security device 310 is described below.

The mechanism of locking and unlocking the security device 300 is now described with an example of the linear actuator 342 comprising a piezo motor, although it is understood that this mechanism is also substantially applicable to other suitable devices such as a micro-stepper motor. Once the security device 310 is fully inserted into the receptacle 382 of the computer port 380, the controller device 332 transmits signals via the transmission cable 334 to the linear actuator 342, causing the piezo nut 342b to vibrate about an axis. As discussed previously, these vibrations are configured to cause the shaft 342a to rotate and thereby be displaced linearly in a direction towards the port 380. One end of the link structure 344 typically is displaced along with the shaft 342a. This displacement results in the other end of the link structure 344 applying a moment or force to the axle 346, causing the axle 346 to rotate or pivot about its axis (for example, in a counter-clockwise direction with respect to FIG. 6b). This causes the coupled one or more locking arms 348 and the locking hooks 348a to be pivoted towards the slots or recesses 384 (not illustrated) of the port 380, from an unlocked to a locked position. The one or more locking arms 348 are typically configured to extend into the computer port 380 and engage one or more apertures, slots or grooves 384 of the computer port 380.

For unlocking the device, the controller device 332 (for example, in response to instructions from the connected external computing device/authentication validation) transmits signals via the transmission cable 334 to the linear actuator 342, causing the piezo nut 342b to vibrate about an axis in a direction opposite to the vibration previously described. These vibrations cause the shaft 342a to rotate and thereby be displaced linearly in a direction away the port 380. One end of the link structure 344 typically is displaced along with the shaft 342a. This displacement results in the other end of the link structure 344 applying a moment or force (in a direction away from the port 380) to the axle 346, causing the axle 346 to rotate or pivot about its axis (for example, in a clockwise direction with respect to FIG. 6b). This causes the coupled one or more locking arms 348 and the locking hooks 348a to be lifted away from the slots or recesses 384 (from a locked to an unlocked position), thereby unlocking the security device 310 so that it is withdrawn from the receptacle 382. As such, FIG. 6b illustrates the movement of the locking arm 348 from a locked position towards an unlocked position.

FIG. 6c illustrates a side view of a computer port security device assembly 325, in accordance with some embodiments of the invention. FIG. 6c illustrates the computer port security device assembly 325 as being substantially identical to the assembly 300 of FIGS. 6a and 6b, except that the shaft 391a of the linear actuator 391 further comprises a link block 391c that is configured to be coupled to the link structure 393. Typically, the link block 391c is similar to the link block described with respect to FIG. 2c. As such, the linear displacement of the shaft 391a is configured to cause the rotation of the axle, via the link block 391c and the link structure 393.

FIGS. 6d and 6e illustrate a top view and a side view of a computer port security device assembly 350, in accordance with alternate embodiments of the invention, respectively. FIGS. 6d and 6e illustrate the computer port security device assembly 350 as being substantially identical to the assembly 300 of FIGS. 6a and 6b, except that the linear actuator 392 employs a micro-solenoid to cause linear displacement of the shaft 392a. Furthermore, the transmission cable comprises two wires 394a and 394b that are configured to convey control signals from the controller device to the linear actuator 392. Typically, application of electrical current to the micro-solenoid by the controller mechanism causes linear displacement of the centrally positioned shaft 392a along an axis of the shaft.

FIG. 7 schematically illustrates a perspective exploded view of a computer port security device assembly 400, in accordance with some embodiments of the invention. As illustrated, the present invention provides a computer port security device 410 or security device 410, which is configured to block a serial port type computer port 480. The computer port 480, as illustrated typically is a serial port, a parallel port, or another D-subminiature connector comprising a connector structure 480a and a two recess structures 480b or nuts 480b on either side of the connector structure 480a. The present embodiment of the invention is configured to secure both male and female serial ports. For a male type computer port 480, the connector structure 480a comprises a raised wall enclosing one or more pins there between. For a female type computer port 480, the connector structure 480a comprises a raised platform comprising one or more recesses for receiving pins.

Furthermore, a securing member 470 is provided. The securing member 470 comprises a planar structure with one or more bends or channels designed to substantially emulate the contour of the computer port 480, and specifically the connector structure 480a and the two recess structures 480b. As illustrated, in some instances, the securing member 470 comprises a hat channel. The securing member 470 further comprises apertures 472a, proximate and coincident with recesses of the recess structures 480b. Typically, the securing member 470 is dimensioned such that there is a recess 474 between the securing member 470 and the computer port 480 proximate the connector structure 480a, when the securing member 470 is assembled with the computer port 480.

In some embodiments two rod structures 478 are provided. These rod structures 478 typically are threaded and each comprise a nut. The rod structures 478 are typically dimensioned to be received in the recesses of the recess structures 480*b* and the apertures of the securing member 470. The rod structures are elongate structures that are configured to secure the security device 410 to the computer port 480, and fasten the securing member 470 with the security device 410 and/or the computer port.

The security device 410 comprises a housing 420 that abuts the securing member 470, when assembled. The housing 420 typically is substantially similar to that described with respect to FIGS. 1, 2*a* and 2*b*. However, the housing 420 comprises apertures or bores that are configured to receive the rod structures 478.

Now referring to FIGS. 8*a* and 8*b*, the structure and functioning of the locking mechanism typically is substantially similar to that described with respect to FIGS. 2*a* and 2*b*. However, in this instance the locking hooks 448*a* of the locking arms 448 are received and secured in the recess 474 between the securing member 470 and the computer port 480. Furthermore, in some embodiments, the housing 420 comprises an open side proximate the computer port such that the housing is configured to receive the computer port 480 and the securing member 470 through the open side into an internal volume of the housing 420, as illustrated by FIG. 8*b*. In some embodiments, the housing 420 is configured to at least substantially enclose the computer port 480 (specifically the connector structure 480*a* and the two recess structures 480*b*) and the securing member 470, as illustrated in FIGS. 8*a* and 8*b*. Here, the securing mechanism is typically similar to that of the embodiments described with respect to FIGS. 2*a* and 2*b*. In some embodiments, the linear actuator 442 comprises a micro-stepper motor or a piezo motor for causing the linear displacement of the shaft 442*a*. As such, this embodiment finds applications in securing unused computer ports 480. The unlocking mechanism typically is executed when use of the ports 480 are desired.

FIG. 8*c* illustrates a side view of a computer port security device assembly 425, in accordance with some embodiments of the invention. FIG. 8*c* illustrates the computer port security device assembly 425 as being substantially identical to the assembly 400 of FIGS. 8*a* and 8*b*, except that the shaft 491*a* of the linear actuator 491 further comprises a link block 491*c* that is configured to be coupled to the link structure 493. Typically, the link block 491*c* is similar to the link block described with respect to FIG. 2*c*. As such, the linear displacement of the shaft 491*a* is configured to cause the rotation of the axle, via the link block 491*c* and the link structure 493.

FIGS. 8*d* and 8*e* illustrate a top view and a side view of a computer port security device assembly 450, in accordance with alternate embodiments of the invention, respectively. FIGS. 8*d* and 8*e* illustrate the computer port security device assembly 450 as being substantially identical to the assembly 400 of FIGS. 8*a* and 8*b*, except that the linear actuator 492 employs a micro-solenoid to cause linear displacement of the shaft 492*a*. Furthermore, the transmission cable comprises two wires 494*a* and 494*b* that are configured to convey control signals from the controller device to the linear actuator 492. Typically, application of electrical current to the micro-solenoid by the controller mechanism causes linear displacement of the centrally positioned shaft 492*a* along an axis of the shaft.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the Plain-English equivalents of the respective terms "comprising" and "wherein." Moreover, in the following claims, the terms "first," "second," and "third," etc. are used merely as labels, and are not intended to impose numerical requirements on their objects.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While certain exemplary embodiments have been described and shown in the accompanying drawings, it is to be understood that such embodiments are merely illustrative of, and not restrictive on, the broad invention, and that this invention need not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A security device for locking a computer port of an electronic device, comprising:
   a housing configured for mechanical insertion of a secure member into the computer port of the electronic device to physically block the computer port;
   a first communication port configured to establish an operative connection between the physically blocked computer port of the security device and an external computing device;
   a securing mechanism positioned within the housing, the securing mechanism comprising:
   one or more locking arms that are configured to extend the secure member into and engage the computer port in a locked position and disengage the computer port in an unlocked position; and
   a linear actuator configured to cause a linear displacement of a shaft via a micro-stepper motor and to move the one or more locking arms between the locked position and the unlocked position by rotating an axle, which is coupled to the one or more locking arms, wherein the linear actuator is coupled to the axle via a link structure such that the linear motion of the shaft causes the axle to rotate;

a controller mechanism positioned within the housing, the controller mechanism being configured to transmit control signals to actuate the linear actuator to thereby cause the one or more locking arms to move between the locked position and the unlocked position;

wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

2. The security device of claim 1, wherein the securing mechanism further comprises:
   a link structure coupled to the linear actuator and an axle, wherein the linear actuator is configured to rotate the axle via the link structure; and
   the axle, the axle being coupled to the one or more locking arms, wherein rotating the axle is configured to cause the one or more locking arms to move between the locked position and the unlocked position.

3. The security device of claim 1, wherein the linear actuator comprises:
   a piezoelectric stator enclosure, wherein vibration of the piezoelectric stator enclosure is configured to cause rotation of a shaft positioned inside the piezoelectric stator enclosure;
   wherein the controller mechanism is configured to transmit control signals that cause vibrations of the piezoelectric stator.

4. The security device of claim 1, wherein the linear actuator comprises a micro-stepper motor, wherein the controller mechanism is configured to transmit control signals that cause the micro-stepper motor to rotate a shaft of the linear actuator.

5. The security device of claim 1, wherein the linear actuator comprises a micro-solenoid, wherein the controller mechanism is configured to transmit electric current to the micro-solenoid to cause linear displacement of a shaft of the linear actuator.

6. The security device of claim 1, wherein the linear actuator comprises a shaft, wherein the linear actuator is configured to cause linear displacement of the shaft by rotating the shaft.

7. The security device of claim 1, wherein the one or more locking arms are configured to engage one or more slots of the computer port in the locked position.

8. The security device of claim 1, wherein the security device is powered by the external computing device, via the operative connection.

9. The security device of claim 1, wherein the validation of the authentication credentials comprises:
   validating device authentication credentials received from the external computing device; and
   validating user authentication credentials provided by a user of the external computing device.

10. The security device of claim 1, wherein the securing mechanism is made from non-magnetic materials.

11. The security device of claim 1, further comprising:
   a second communication port configured to establish operative connection between a peripheral device and the physically blocked computer port;
   wherein the controller mechanism is configured to establish an operative communication channel between the peripheral device and the electronic device, via the physically blocked computer port, in response to successful validation of the authentication credentials.

12. The security device of claim 11, wherein the validation of the authentication credentials comprises validating device authentication credentials received from the peripheral device.

13. The security device of claim 11, wherein the validation of the authentication credentials comprises:
   determining that the external computing device is disconnected from the security device;
   de-validating the peripheral device; and
   terminating the operative communication channel between the peripheral device and the electronic device.

14. A security device for locking a computer port of an electronic device, comprising:
   a housing configured for mechanical insertion of a secure member into the computer port of the electronic device to physically block the computer port;
   a first communication port configured to establish an operative connection between the security device and an external computing device;
   a securing mechanism positioned within the housing, the securing mechanism comprising:
   a linear actuator comprising a shaft, wherein the linear actuator is configured to cause a linear displacement of the shaft via a micro-stepper motor;
   one or more locking arms that are configured to extend the secure member into and engage the computer port in a locked position and disengage the computer port in an unlocked position;
   an axle coupled to the one or more locking arms, wherein the axle is configured so that rotating the axle causes the one or more locking arms to move between the locked position and the unlocked position;
   a link structure coupled to the linear actuator and the axle such that the linear displacement of the shaft of the linear actuator causes the axle to rotate;
   a controller mechanism positioned within the housing, the controller mechanism being configured to transmit control signals to actuate the linear actuator to thereby cause the one or more locking arms to move between the locked position and the unlocked position;
   wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

15. A security device for locking a computer port of an electronic device, comprising:
   a housing configured to physically block the computer port of the electronic device;
   a first communication port configured to establish an operative connection between the physically blocked computer port of the security device and an external computing device;
   a securing member configured to be coupled to the computer port;
   a securing mechanism positioned within the housing, the securing mechanism comprising:
   one or more locking arms that are configured to engage the securing member in a locked position and disengage the securing member in an unlocked position; and
   a linear actuator configured to cause a linear displacement of a shaft via a micro-stepper motor and to move the one or more locking arms between the locked position and the unlocked position by rotating an axle, which is coupled to the one or more locking arms, wherein the linear actuator is coupled to the axle via a link structure such that the linear motion of the shaft causes the axle to rotate;

a controller mechanism positioned within the housing, the controller mechanism being configured to transmit control signals to actuate the linear actuator to thereby cause the one or more locking arms to move between the locked position and the unlocked position;

wherein the controller mechanism is configured to receive authentication credentials from the external computing device, wherein the controller mechanism is configured to transmit a control signal to actuate the linear actuator to thereby cause the locking arms to move from the locked position to the unlocked position in response to successful validation of the authentication credentials.

16. The security device of claim 15, wherein the housing comprises an internal volume, wherein:

the housing comprises an open side proximate the computer port such that the housing is configured to receive the computer port and the securing member through the open side into the internal volume; and the housing is configured to substantially enclose the computer port and the securing member.

17. The security device of claim 15, the security device further comprises one or more rod structures that are configured to secure the securing member and the computer port, wherein the housing comprises an internal volume configured to receive the one or more rod structures.

* * * * *